United States Patent
Deno et al.

(10) Patent No.: US 7,490,139 B2
(45) Date of Patent: Feb. 10, 2009

(54) EMBEDDED BUSINESS APPARATUS INCLUDING WEB SERVER FUNCTION

(75) Inventors: Ryuhei Deno, Kanagawa (JP); Manabu Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 748 days.

(21) Appl. No.: 11/030,360

(22) Filed: Jan. 7, 2005

(65) Prior Publication Data
US 2005/0180398 A1  Aug. 18, 2005

(30) Foreign Application Priority Data
Jan. 8, 2004  (JP) ............................... 2004-003119

(51) Int. Cl.
*G06F 15/16* (2006.01)
(52) U.S. Cl. ...................... 709/219; 709/203; 709/205; 709/218; 709/227; 709/230
(58) Field of Classification Search ................ 709/202, 709/203, 205, 218, 219, 227, 230
See application file for complete search history.

(56) References Cited

U.S. PATENT DOCUMENTS 5,761,507 A * 6/1998 Govett ........................ 718/101
6,460,084 B1 * 10/2002 Van Horne et al. ............. 709/227
6,943,910 B2 * 9/2005 Tanimoto ..................... 358/1.15
7,177,897 B2 * 2/2007 Manukyan .................... 709/200
2002/0194282 A1 * 12/2002 Saito et al. ................... 709/206
2003/0152038 A1 * 8/2003 Oshima et al. ................ 370/252

FOREIGN PATENT DOCUMENTS

| JP | 10-173890 | 6/1998 |
| JP | 2002-236627 | 8/2002 |
| JP | 2004-185464 | 7/2004 |

* cited by examiner

*Primary Examiner*—Yves Dalencourt
(74) *Attorney, Agent, or Firm*—Oblon, Spivak, McClelland, Maier & Neustadt, P.C.

(57) ABSTRACT

In an embedded business apparatus, a Web server function receives a network protocol request including an IP address by a network protocol daemon and a port number, processes the request, and responds to the request by sending a network protocol response. The request includes an obtained request of port information including a port number specifying the port, and the Web server function includes the response including the port information obtained by processing the obtained request and including Web information making it possible for a user to input a change instruction for changing the port information.

10 Claims, 27 Drawing Sheets

FIG.10A

| PORT IDENTIFICATION | PORT NUMBER | SECURED | SERVER CERTIFICATION ID | PORT STATE |
|---|---|---|---|---|
| HTTP | 80 | FALSE | – | INACTIVE |
| HTTPS | 443 | TRUE | 0 | INACTIVE |
| IPP | 631 | FALSE | – | INACTIVE |
| ... | ... | ... | ... | ... |

FIG.10B

| PORT IDENTIFICATION | PORT NUMBER | SECURED | SERVER CERTIFICATION ID | PORT STATE |
|---|---|---|---|---|
| HTTP | 80 | FALSE | – | ACTIVE |
| HTTPS | 443 | TRUE | 0 | ACTIVE |
| IPP | 631 | FALSE | – | INACTIVE |
| ... | ... | ... | ... | ... |

FIG.17

NOTICE FROM ADMINISTRATOR ~43a

SERVER SETTINGS ARE CHANGED.
PLEASE ACCESS THE FOLLOWING ADDRESS }43b
IN THE FUTURE:

http://100.100.10.111:8080/ ~43c

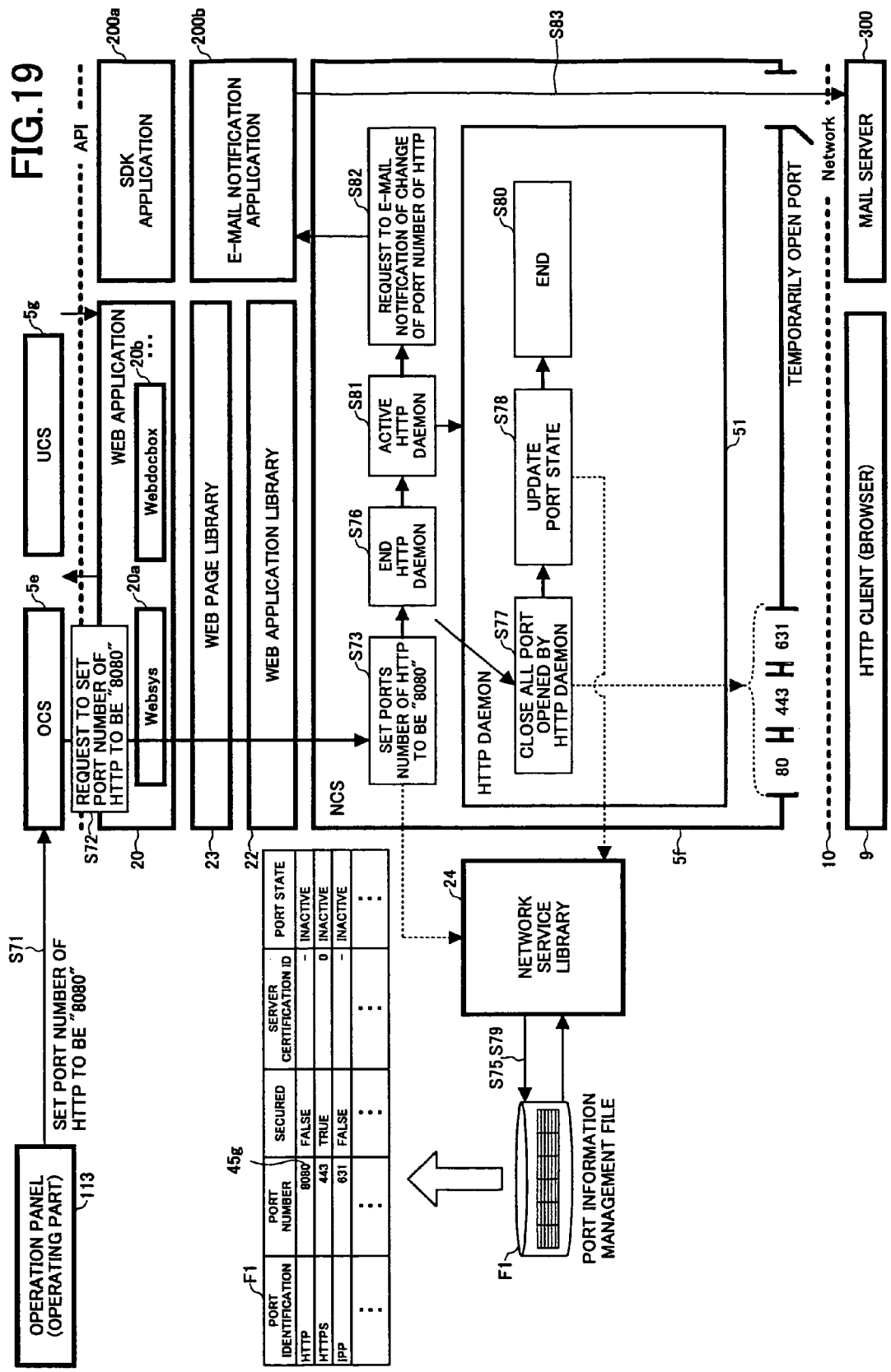

FIG.22A

| PORT IDENTIFICATION | PORT NUMBER | SECURED | SERVER CERTIFICATION ID | PORT STATE |
|---|---|---|---|---|
| HTTP | 80 | FALSE | – | ACTIVE |
| HTTPS | 443 | TRUE | 0 | ACTIVE |
| IPP | 631 | FALSE | – | ACTIVE |
| ... | ... | ... | ... | ... |

FIG.22B

| PORT IDENTIFICATION | PORT NUMBER | SECURED | SERVER CERTIFICATION ID | PORT STATE |
|---|---|---|---|---|
| HTTP | 8080 | FALSE | – | ACTIVE |
| HTTPS | 443 | TRUE | 0 | ACTIVE |
| IPP | 631 | FALSE | – | ACTIVE |
| ... | ... | ... | ... | ... |

FIG.22C

| PORT IDENTIFICATION | PORT NUMBER | SECURED | SERVER CERTIFICATION ID | PORT STATE |
|---|---|---|---|---|
| HTTP | 8080 | FALSE | – | INACTIVE |
| HTTPS | 443 | TRUE | 0 | INACTIVE |
| IPP | 631 | FALSE | – | INACTIVE |
| ... | ... | ... | ... | ... |

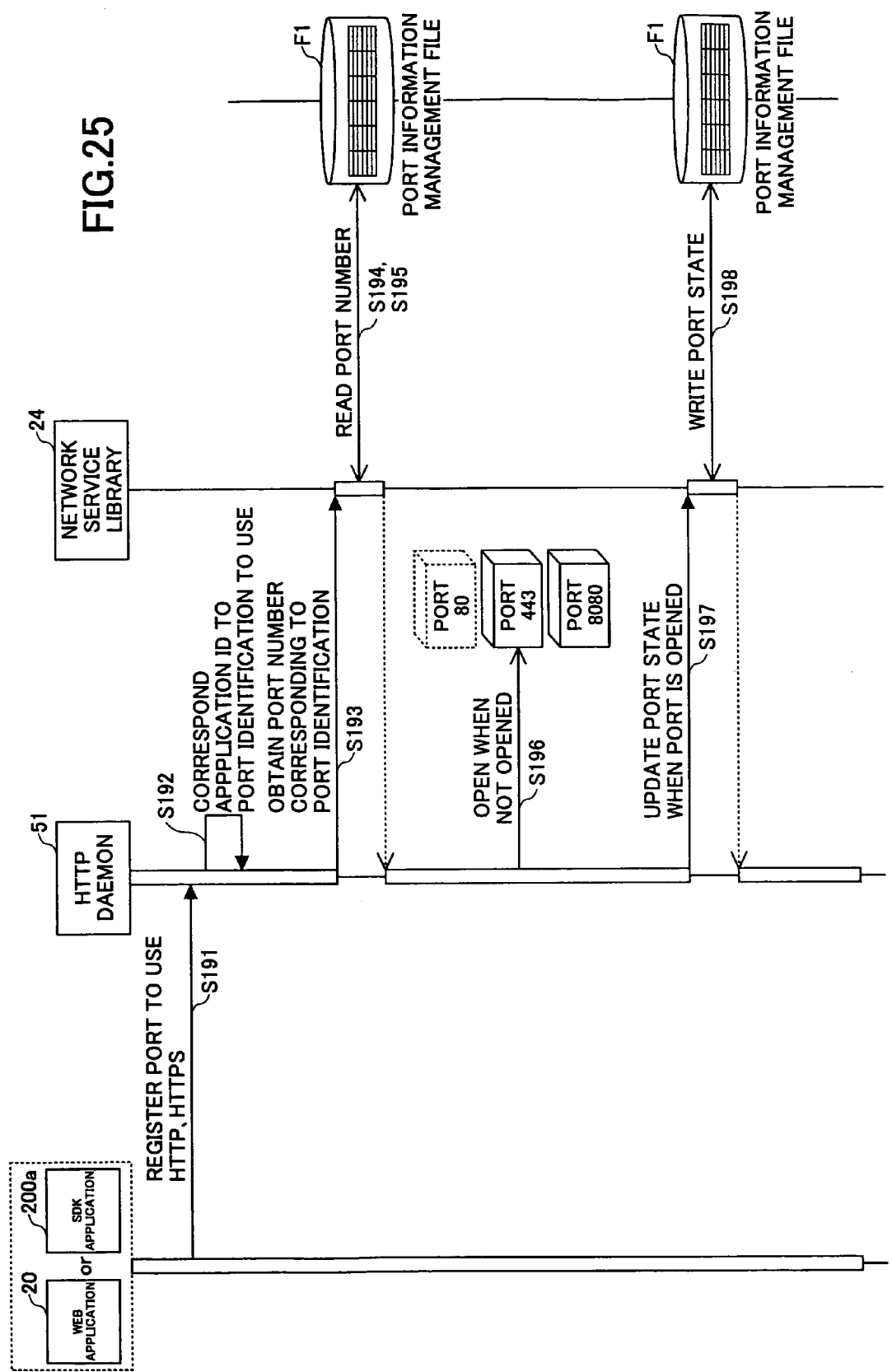

FIG.26A

| PORT IDENTIFICATION | PORT NUMBER | SECURED | SERVER CERTIFICATION ID | PORT STATE |
|---|---|---|---|---|
| HTTP | 8080 | FALSE | - | INACTIVE |
| HTTPS | 443 | TRUE | 0 | INACTIVE |
| IPP | 631 | FALSE | - | INACTIVE |
| ... | ... | ... | ... | ... |

FIG.26B

| PORT IDENTIFICATION | PORT NUMBER | SECURED | SERVER CERTIFICATION ID | PORT STATE |
|---|---|---|---|---|
| HTTP | 8080 | FALSE | - | ACTIVE |
| HTTPS | 443 | TRUE | 0 | ACTIVE |
| IPP | 631 | FALSE | - | INACTIVE |
| ... | ... | ... | ... | ... |

EMBEDDED BUSINESS APPARATUS INCLUDING WEB SERVER FUNCTION

BACKGROUND OF THE INVENTION

1. Field of the Invention

The present invention generally relates to embedded business apparatuses including a Web server function, and more particularly to an embedded business apparatus including a Web server function in that a port to use can be registered by using a port identification uniquely identifying a port corresponding to a network protocol and in that a Web application can change a port number independently of the port number.

2. Description of the Related Art

Recently, an image forming apparatus such as a facsimile, a copier, a printer, or a like provides information or conducts a process through a network.

For example, Japanese Laid-open Patent Application No. 10-173890 discloses that a user can send an HTTP (HyperText Transfer Protocol) request from a Web browser of a terminal and can operate a facsimile transmission function with respect to the image forming apparatus including a facsimile function through the network.

Moreover, Japanese Laid-open Patent Application No. 2002-236627 discloses that regarding security for a computer connecting to the network, in a case of connecting the computer having a firewall to the network due to a data transmission, a service port number of a server application can be dynamically changed before conducting a socket process. As a mechanism for dynamically changing a port number, it is offered to determine a service port number by changing for each communication by using a random number that is unique along a time series. In this mechanism, a client terminal connecting to such computer determines the service port number. Thus, the client can communicate with the computer by using the same service port number as the service port number determined by the computer.

Currently, in a field of the business apparatus such as the image forming apparatus, since a Web server function is implemented for the business apparatus, the user can refer to or set a status of the business apparatus by using the Web browser of the terminal of the user not only inside an office but also outside the office, through the Internet.

As a protocol in a case of accessing the business apparatus though the Internet, an HTTP (HyperText Transfer Protocol) is generally used. A port number to use for an HTTP communication is "80" which is well-known as a regular port number to use for the HTTP communication.

However, since the port number "80" as a regular use is widely well-known, the port number "80" can be a target for an ill-disposed third party to attack. Thus, as a purpose to improve security, it is needed to change a port number used in the HTTP communication.

However, if the Web browser does not indicate a port number of the Web server to connect in the HTTP communication, automatically "80" is used for the port number for the HTTP communication. Thus, if a port number different from "80" is used, the user is required to manually indicate a specific port number. Accordingly, it is needed to have all users know a new port number when the Web server changes the port number to use for the HTTP communication other than "80".

In a general Web server providing contents for any user through the Internet, it is practically impossible to have all users know the change of the port number.

On the other hand, in a case of a general business apparatus which is assumed to be used by only the specific small number of users within an office or through the Internet, it may be considered that it is possible to have all these specific users know the change of the port number.

However, in a conventional business apparatus, since a protocol daemon (httpd) encompasses the port number for use in-house only, it is not possible to easily change contents concerning the port number.

Moreover, in the future, considering the security, in order to prevent the Web application from an attack coming from an unexpected port, a port is registered to the Web server for each Web application in the Web server of the business apparatus. In a method for registering a port number directly to the Web server, it is difficult to promptly associate with a change of the port number.

SUMMARY OF THE INVENTION

It is a general object of the present invention to provide embedded business apparatuses including a Web server function in which the above-mentioned problems are eliminated.

A more specific object of the present invention is to provide an embedded business apparatus including a Web server function, in which a port identification uniquely identifying a port corresponding to a network protocol is defined and used to register as a port to use for the Web server, so that a mechanism can be provided to enable an existing Web application to structure a system and to support a change of a port number.

A further specific object of the present invention is to provide a mechanism for sending an URL (Uniform Resource Locator), which is to access to the business apparatus and to browse information including a new port number, to a user using the business apparatus when a port number is changed, in order to make it easier to have the user know the new port number.

The above objects of the present invention are achieved by an embedded business apparatus including a Web server function, wherein the Web server function receives a network protocol request including an IP address by a network protocol daemon and a port number, processes the network protocol request, and responds to the network protocol request by sending a network protocol response, and wherein the network protocol request includes an obtain request of port information including a port number specifying the port, and the Web server function includes the network protocol response including the port information obtained by processing the obtain request and including Web information possible to input a change instruction for changing the port information.

According to the present invention, in the embedded business apparatus including a Web server, in response to a network protocol request (HTTP request) indicating a port number currently available, it is possible to send a network protocol response (HTTP response), which allows a user to set (change) the port number, as a response.

Moreover, in the embedded business apparatus, when the Web server function receives the network protocol request including a set request conducted for the change instruction of the port information, which is set by using the network protocol response, the Web server function may set the port information in accordance with the set request.

According to the present invention, in the embedded business apparatus, it is possible to conduct a process corresponding to a set request for the port information.

Furthermore, in the embedded business apparatus, the Web server function may inform that the port information is set.

According to the present invention, in the embedded business apparatus, for example, it is possible to inform a user that the port information is set (changed), by Web, electronic mail, and facsimile.

Moreover, the embedded business apparatus further may include a document distribution function for distributing document data through a networks, and the Web server function may inform by electronic mail that the port information is set, by using the document distribution function.

According to the present invention, in the embedded business apparatus, it is possible to inform by using the document distribution function that the port information is set (changed).

Furthermore, in the embedded business apparatus, a link including port information being set may be provided in the electronic mail.

According to the present invention, when the user receives the electronic mail provided from the embedded business apparatus, the user may add the like as a favorite in a Web browser. Therefore, it is possible to easily access the embedded business apparatus without concerning the change of the port information.

Moreover, in the embedded business apparatus, the Web server function may inform to destinations being registered in the document distribution function or a facsimile function by using the document distribution function or the facsimile function.

According to the present invention, it is possible to inform the port information to access the embedded business apparatus by using the document distribution function or the facsimile function.

Furthermore, in the embedded business apparatus, the port information may include port identification uniquely identifying a port corresponding to the network protocol, and the Web server function sets the port information based on the port identification and obtains the port information.

According to the present invention, it is possible for the embedded business apparatus to set and obtain the port number by corresponding to the port identification.

Moreover, the embedded business apparatus further may include at least one application for processing the network protocol request, wherein the port information, which the application itself processes, is registered to the network protocol daemon.

According to the present invention, it is possible for the application to register the port information.

Furthermore, in the embedded business apparatus, the port information registered by the application may be the port identification.

According to the present invention, it is possible for the application to register a port subject to use, by using the port identification.

The above objects of the present invention can be achieved by a method for receiving a network protocol request and sending a network protocol response, by a program product for causing a computer functioning as a Web server to conduct the described-above processes or by a computer-readable recording medium recorded with a program for causing a computer functioning as a Web server to conduct described-above processes.

BRIEF DESCRIPTION OF THE DRAWINGS

In the following, embodiments of the present invention will be described with reference to the accompanying drawings.

FIG. 10A is a diagram showing a state of a port information management file before the operation when the port number "80" is used for the HTTP, according to the embodiment of the present invention, and FIG. 10B a diagram showing a state of a port information management file after the operation when the port number "80" is used for the HTTP, according to the embodiment of the present invention;

FIG. 17 is a diagram showing an example of an e-mail informing the address for the changed port number, according to the embodiment of the present invention;

FIG. 19 is a diagram for explaining the operation in a case of setting the port number by using the operation panel, according to the embodiment of the present invention;

FIG. 22A is a diagram showing a state of the port information management file before the port number is changed by the network service library in steps S154 and S155 in FIG. 21, according to the embodiment of the present invention, FIG. 22B is a diagram showing the state of the port information management file after the port number is changed by the network service library in steps S154 and S155 in FIG. 21, according to the embodiment of the present invention, and FIG. 22C is a diagram showing the state of the port information management file after the port state is written by the network service library in step S159 in FIG. 21, according to the embodiment of the present invention.

FIG. 25 is a diagram showing a detailed sequence for explaining the operation in the case of using the changed port number for the HTTP, according to the embodiment of the present invention;

FIG. 26A is a diagram showing a state of the port information management file when the port number is read by the network service library in step S194 in FIG. 25, according to the embodiment of the present invention, and FIG. 26B is a diagram showing the state of the port information management file when the port number is written by the network service library 24, according to the embodiment of the present invention.

DESCRIPTION OF THE PREFERRED EMBODIMENT

In the following, an embodiment of the present invention will be described with reference to the accompanying drawings.

An image forming apparatus according to an embodiment of the present invention accommodates functions corresponding to apparatuses such as a printer, a copier, a facsimile, a scanner, and a like as embedded business apparatuses including a Web server function within a single chassis, and can provide information concerning an image formation by a plurality of Web applications. For example, an image processing system including the image forming apparatus has a system configuration as shown in FIG. 1.

Figure 1:
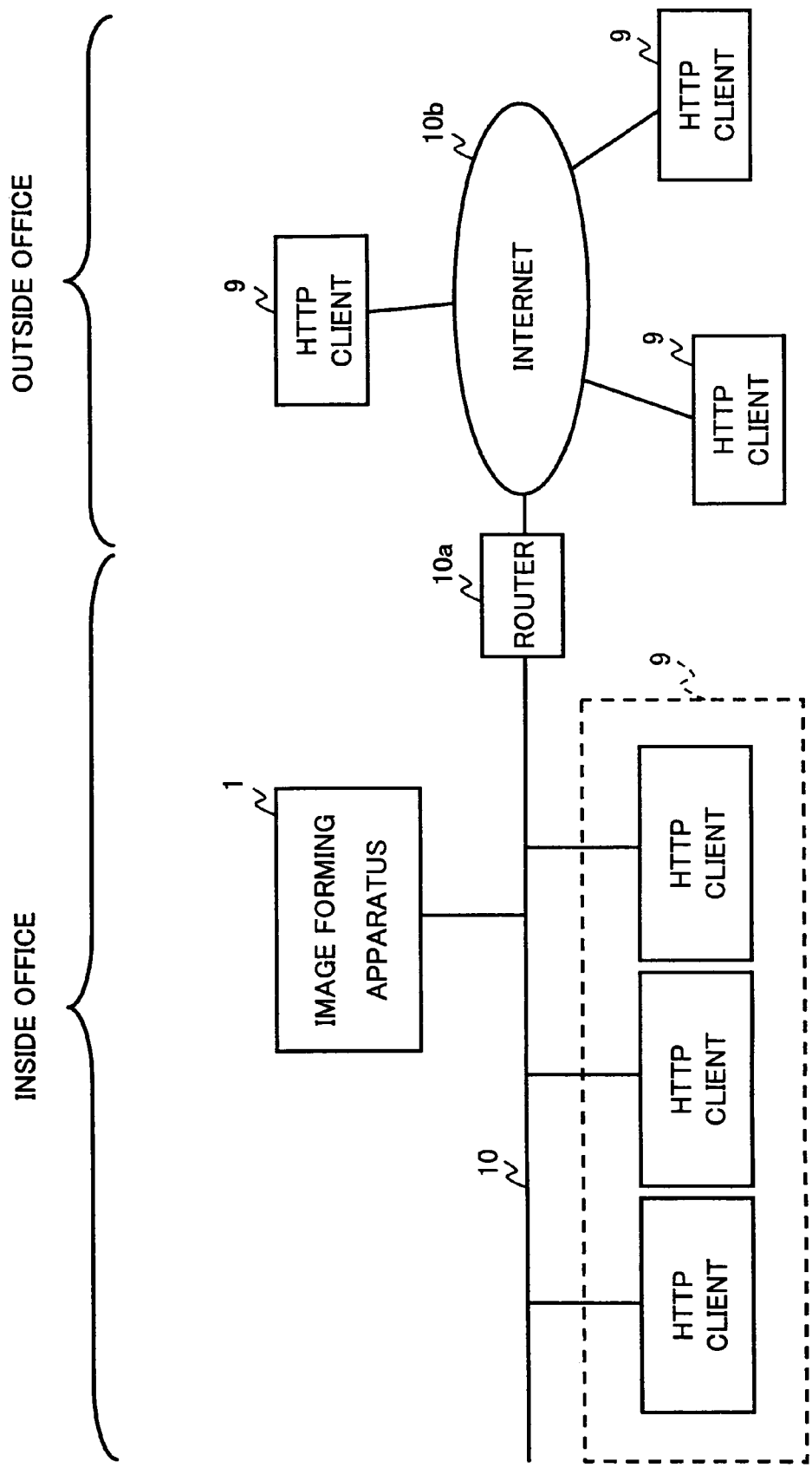
FIG. 1 is a diagram showing a system configuration of an image processing system according to an embodiment of the present invention.

FIG. 1 is a diagram showing the system configuration of the image processing system according to the embodiment of the present invention. In FIG. 1, in the image processing system 1000, a plurality of HTTP (HyperText Transfer Protocol) clients 9 are mounted inside an office and connected to each other through a network 10. In addition, other HTTP clients 9 outside the office can connect to the image forming apparatus 1 through a router 10a connecting to the network 10 inside the office and the Internet 10b outside the office. The network 10 may be a LAN (Local Area Network) built in the office, an Intranet, the Internet, or a like. The image forming apparatus 1 functions as a Web server and conducts a predetermined process in response to an HTTP request from the HTTP clients 9 being inside and outside the office, and provides a process result as an HTTP response to the HTTP clients 9.

The image forming apparatus 1 conducts a process such as a print process to print out document data, a fax transmission process to transmit the document data by fax, or a like, in response to the HTTP request from the HTTP clients 9. Moreover, in response to the HTTP request, the image forming apparatus 1 sends a Web page for displaying information requested by the HTTP request to the HTTP client 9 originating the HTTP request. For example, in a case in that a user of the HTTP client 9 requests status information of the image forming apparatus 1 from the Web browser of the HTTP client 9, the image forming apparatus 1 sends HTML (HyperText Markup Language) data storing the status information to the HTTP client 9. Furthermore, the HTTP client 9 can be a PC (Personal Computer), a PDA (Personal Digital (Data) Assistants), a mobile phone, and a like, which is directly used by the user, and includes the Web browser for displaying the Web page that is sent from the image forming apparatus 1.

Figure 2:
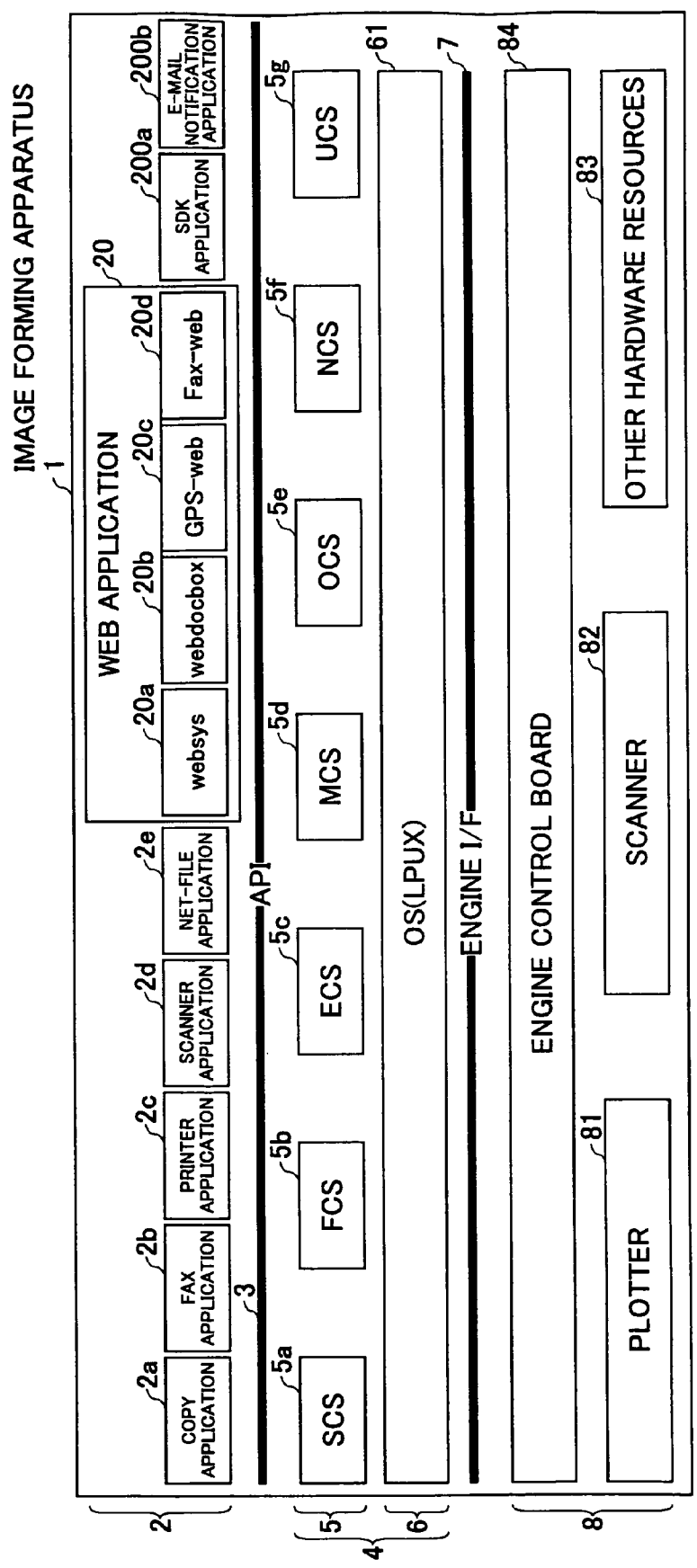
FIG. 2 is a block diagram showing a functional configuration of the image forming apparatus according to the present invention.

FIG. 2 is a block diagram showing a functional configuration of the image forming apparatus according to the present invention.

In FIG. 2, the image forming apparatus 1 includes an application layer 2, and a platform layer 4, and an engine part 8. An interface 3 is an application program interface (API) provided by the platform layer 4 with respect to the application layer 2, and an engine interface 7 is an engine interface (engine I/F) provided between the platform layer 4 and the engine part 8.

The application layer 2 is a software group for conducting various individual processes in the image forming apparatus 1, and includes a copy application 2a being an application for a copy, a fax application 2b being an application for a fax, a printer application 2c being an application for a printer, a scanner application 2d being an application for a scanner, and a net-file application 2e being an application for a network file to exchange a file through the network 10 (shown in FIG. 1).

Moreover, the Web application 20 is an application group for conducting a Web service in accordance with an HTTP protocol and is implemented in the image forming apparatus 1 beforehand (on board). The Web application 20 includes a Websys 20a as a Web application in that a state of the image forming apparatus 1 can be browsed by using the Web browser and network settings of the image forming apparatus 1 and a like possible through the network 10, a webdocbox 20b as a Web application in that a document can be retrieved and managed through the Web browser by using the net-file application 2e, a GPS-web 20c as a Web application for displaying a job history (state of spool) of the printer, and a fax-web 20d as a Web application in that initial settings and a communication management report (communication history) of the fax can be browsed in a display form.

Furthermore, an SDK (Software Development Kit) application 200a is an application developed by a third party, and for example, can be a "job-oriented document management software" or a like.

Moreover, an e-mail notification application 200b includes an e-mail notification function for informing a change of a port number by sending an electronic mail (hereinafter, simply called e-mail) to an e-mail address of a user, and then provides information by e-mail. In general, the e-mail notification application 200b is used as a document distribution function (called Scan to Mail) for e-mailing a document, which is scanned by the scanner application 2d, to a plurality of predetermined users. In this embodiment, the document distribution function is used to have the plurality of predetermined users know an URL address additionally providing a changed port number.

Moreover, common functions, which are omitted in FIG. 1, are provided for applications between the application layer 2 and the interface 3 so as to appropriately provide a library (platform layer 4), which makes it easier to develop software.

On the other hand, the platform layer 4 is a software group for providing common service functions for the applications in the application layer 2 through the interface 3, and separately includes a service layer 5 and an OS layer 6. The service layer 5 includes a SCS (System Control Service) 5a including a plurality of functions such as an application management, an operation control, a system screen display, an LED (Light Emitting Diode) display, a resource management, an interruption control, and a like, an FCS (FAX Control Service) 5b for providing an application program interface of the fax function, an ECS (Engine Control Service) 5c for controlling an engine part, an MCS (Memory Control Service) 5d for conducting a memory control, an OCS (Operation panel Control Service) 5e for controlling an operation part (operation panel) functioning as an interface for an operator, an NCS (Network control Service) 5f for providing a common service used by applications that are required to output and input information to/from the network 10, and a UCS (User Control Service) 5g for managing and controlling user information. The OS layer 6 includes an OS (LPUX) 61.

The UCS 5g manages the user information that is registered by the document distribution function (Scan to Mail) or the fax application 2b. The user information includes an e-mail address, a FAX number, and a like for each user.

On the other hand, the engine part 8 includes engines such as a plotter 81, a scanner 82, and other hardware resources 83, and an engine control board 84 for controlling these engines.

Figure 3:
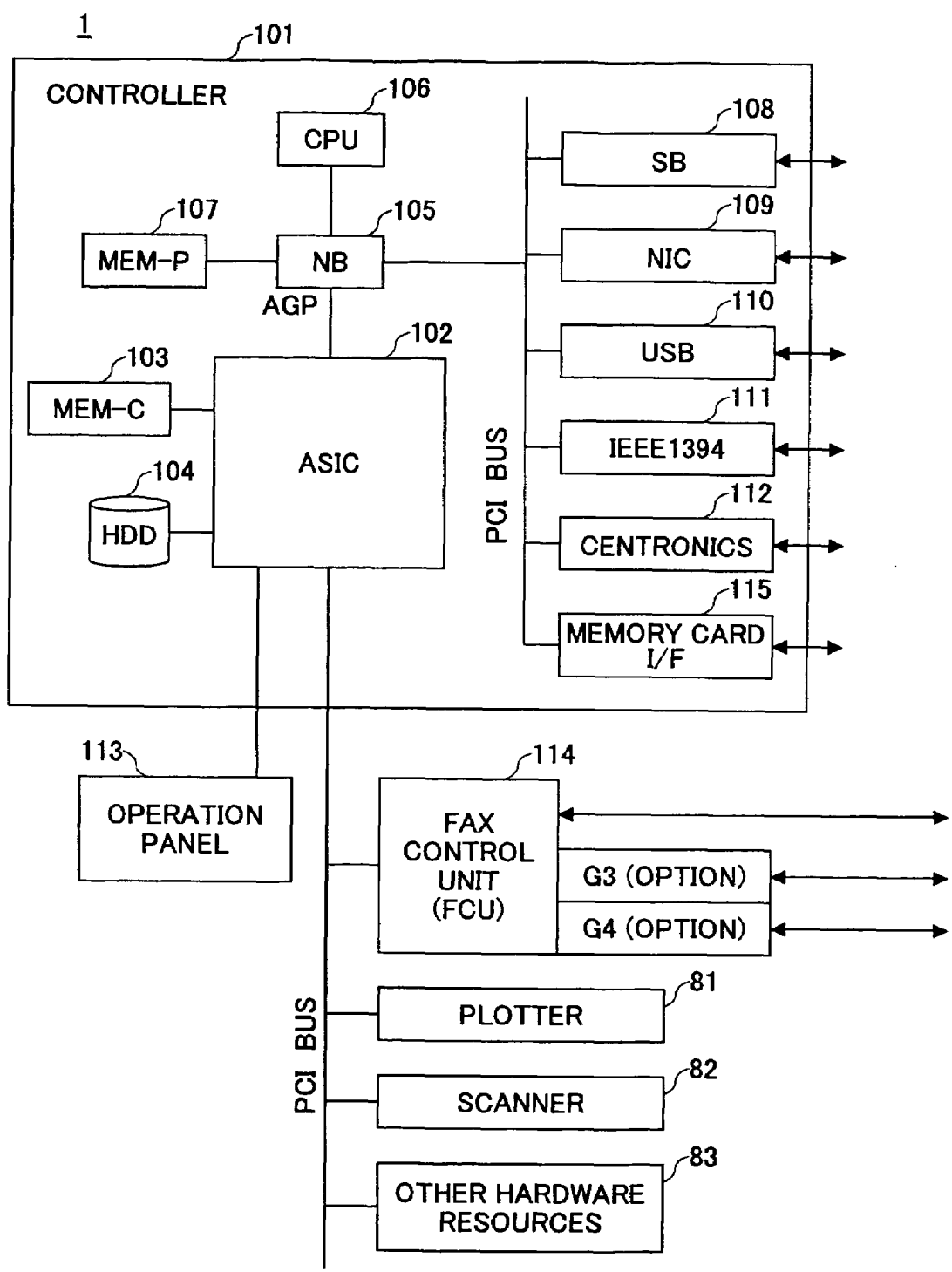
FIG. 3 is a block diagram showing a hardware configuration of the image forming apparatus according to the embodiment of the present invention.

FIG. 3 is a block diagram showing a hardware configuration of the image forming apparatus according to the embodiment of the present invention.

In FIG. 3, the image forming apparatus 1 is formed by connecting an operation panel 113, a fax control unit 114, the plotter 81, the scanner 82, and the other hardware resources 83 are connected to a controller 101 for conducting a main control operation of the image forming apparatus 1.

In the controller 101, an ASIC (Application Specific Integrated Circuit) 102 as an IC (Integrated Circuit) to use for an image process is connected to a CPU 106 that is an IC for a general control, through an NB (North Bridge) 105 functioning as a bridge. Also, in the controller 101, an SB (South Bridge) 108 as a bridge to connect to peripheral devices or a like, an NIC (Network Interface Card) 109 for controlling a network communication, an USB (Universal Serial Bus) 110 for providing a USB interface, an IEEE 1394 111 for providing an IEEE 1394 interface, a centronics 112 for providing a centronics interface, and a memory card interface 115 for input and output a program and data to/from a memory card storing an optional application are connected to a bus of the NB 105. Moreover, a MEM-C 103 and an HDD (Hard Disk Drive) 104 as storage units are connected to the ASIC 102, and a MEM-P 107 as a storage unit is connect to the NB 105. A memory card interface 115 may use a part or the entire function of the USB 110.

Figure 4:
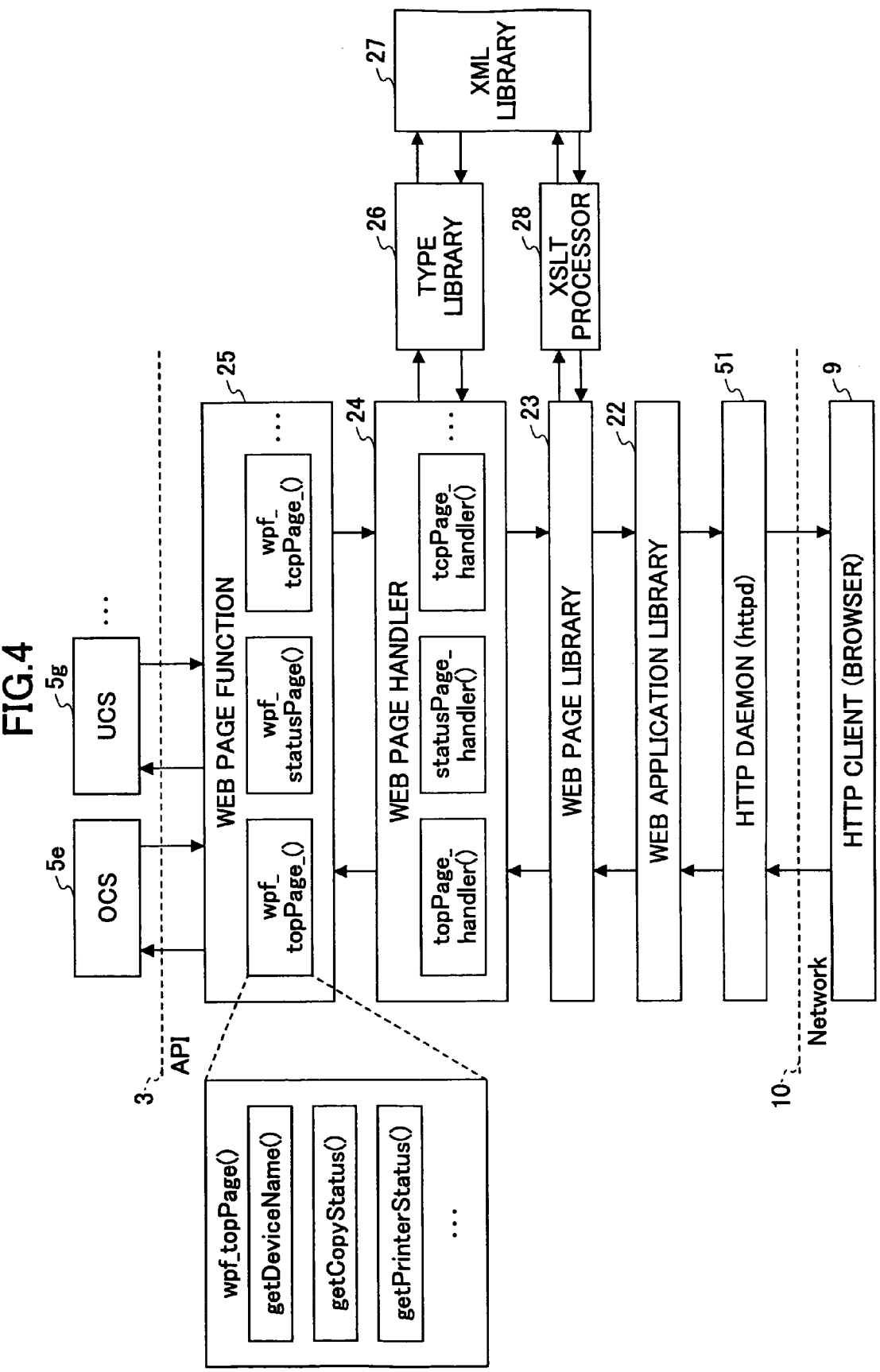
FIG. 4 is a block diagram showing a module configuration of a Web application according to the embodiment of the present invention.

FIG. 4 is a block diagram showing a module configuration of the Web application according to the embodiment of the present invention. The module configuration shown in FIG. 4 realizes a Web server function functioning as the Web server.

In FIG. 4, the Websys 20a of the Web application 20 is connected to an httpd (HyperText Transfer Protocol Daemon) 51 (a part of a function of the NCS 51 in FIG. 2) for distributing an HTTP request received through a network 10 from the HTTP client 9 using the Web browser and replying by sending a process result (in HTML (HyperText Markup Language), XML (extensible Markup Language), or text) of the Web application 20. Websys 20a includes a Web application library 22 and a Web page library 23 that are framework for developing Web applications providing various common functions, a Web page handler 24 for operating each Web page, a Web page function 25 for conducting a detail process concerning a display of the Web page, a type library 26 for converting process result data by describing in XML and serializing the process result data, an XML (extensible Markup Language) library 27 for analyzing XML data and describing in XML, and an XSLT (XSL Transformations) processor 28 for converting the process result described in XML into the process result described in HTML.

The Web page handler 24 and the Web page function 25 configure process functions to realize the Web page. In addition, the Web page function 25 communicates with the OCS 5e and the UCS 5g through the Interface 3 when the Web page function 25 conducts a process.

In addition, a Web application 20, a Web application library 22, and the Web page library 23 are substantially united to form a single Web application.

Moreover, the process result informed from the Web page function 25 is described in XML, so as that the process result can be serialized by the type library 26.

A mechanism possible for the Web application 20 and the SDK application 200a to obtain a port state, a mechanism possible for the NCS 5f to set a port number, and a mechanism possible for the HTTP daemon 51 to obtain the port number and to obtain a port state will be schematically described according to the embodiment of the present invention.

Figure 5:
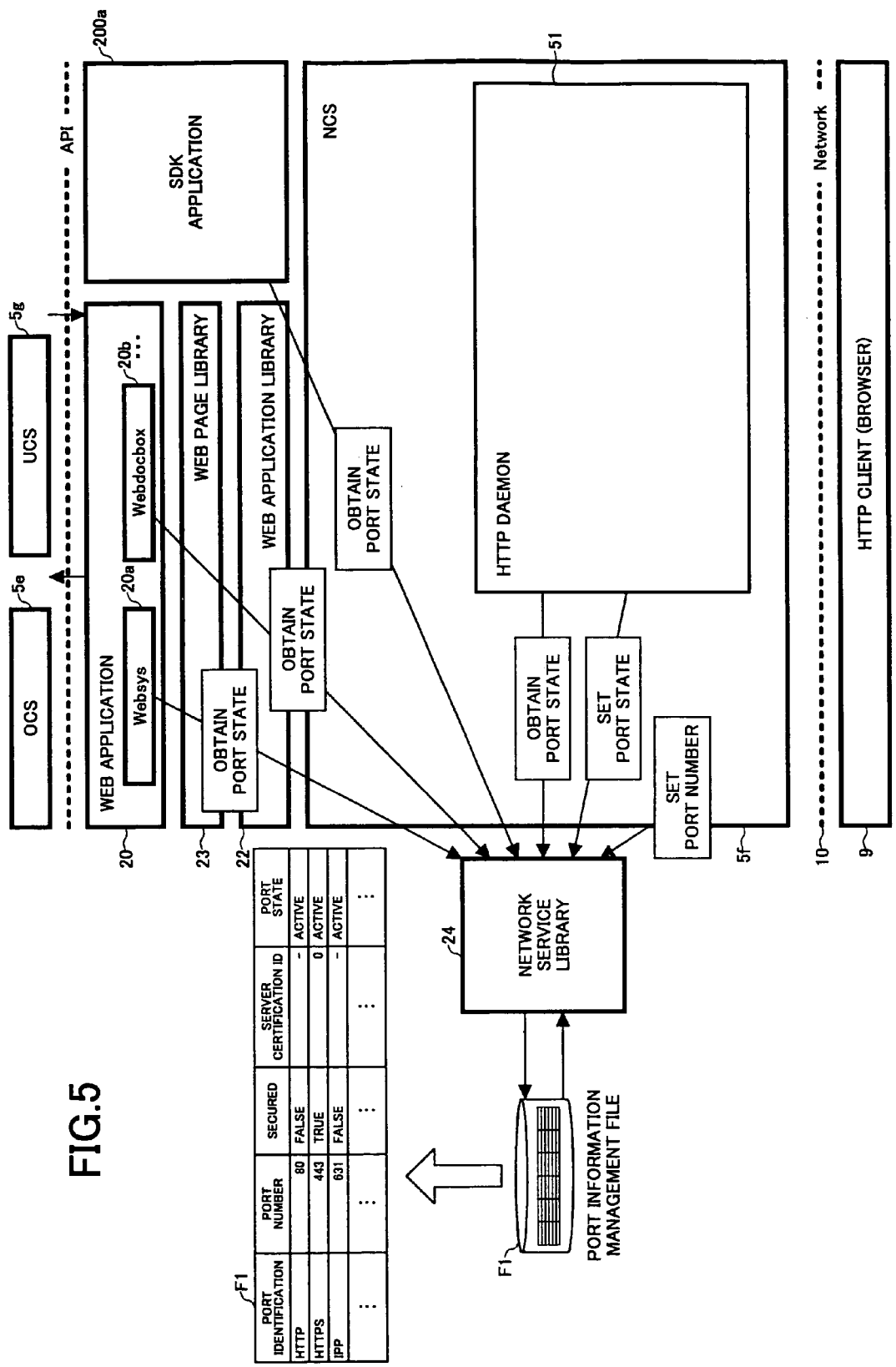
FIG. 5 is a schematic diagram showing a functional configuration to share port information, according to the embodiment of the present invention.

FIG. 5 is a schematic diagram showing a functional configuration to share port information, according to the embodiment of the present invention.

In FIG. 5, in general, the Web server function is realized by the NCS 5f that is a communication control module to be connected to the HTTP clients 9 (in general, Web browser operating for the personal computer) through the network 10 such as the Internet, the Web application 20 for conducting a predetermined operation such as a display of the Web page or a like, libraries (framework) 22 and 23 for a Web application development for providing various common functions with respect to the Web application 20, and the OCS 5e and the UCS 5g accessed from the Web application 20. In this case, the Web application 20 and the libraries 22 and 23 are substantially united to form the Web application.

Moreover, the HTTP daemon 51 in the NCS 5f distributes an HTTP request sent from the HTTP client 9 to the Web application 20 corresponding to the HTTP request through the libraries 22 and 23, and returns a process result (HTML, XML, TEXT) output from the Web application 20, to the HTTP client 9.

On the other hand, a network service library 24 is provided as a part realizing a main function to share port information in the present invention. In the network library 24, the port information is sent from the NCS 5f. Also, the port information is stored in a port information management file F1 and can be referred to from the Web application 20, the Web application library 22, and the Web page library 23.

The port information management file F1 includes fields for "port identification" uniquely identifying a port corresponding a service to provide, "port number" showing a number assigned to the port, "secured" showing whether or not the port is secured, "server certification ID" showing a storage area ID for a server certificate, "port state" showing "active" in that the port is active or showing "inactive" in that the port is inactive, and a like. The port information management file F1 is centralized and managed by the network service library 24.

Operations in a case of normally using a port number "80" for HTTP will be described with reference to FIG. 6.

Figure 6:
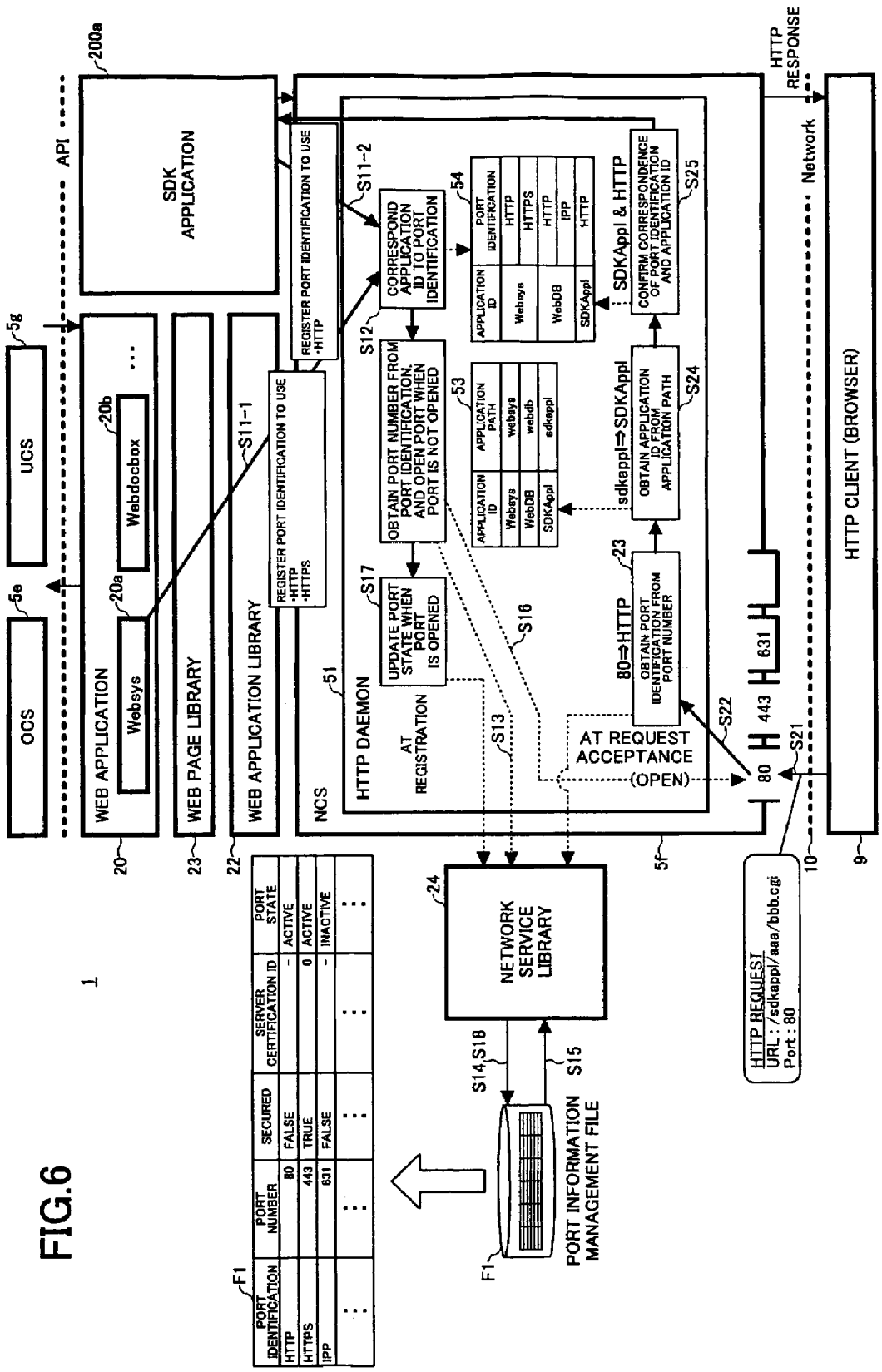
FIG. 6 is a diagram showing an operation in a case of normally using a port number "80" for HTTP, according to the embodiment of the present invention.

FIG. 6 is a diagram showing the operation in a case of normally using a port number "80" for the HTTP, according to the embodiment of the present invention.

Figure 7:
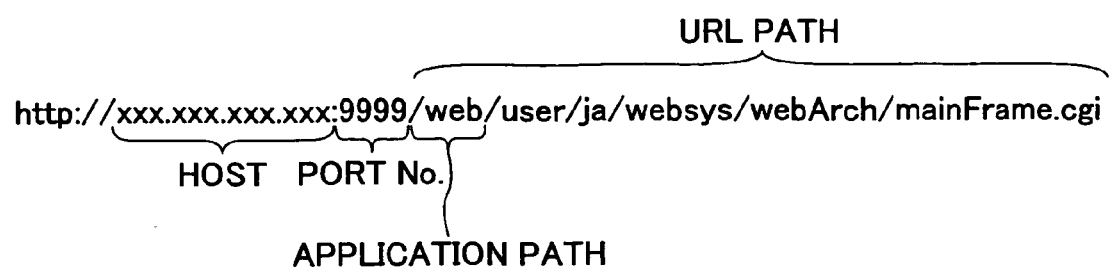
FIG. 7 is a diagram for explaining an application path and an URL path, according to the embodiment of the present invention.

In FIG. 6, the HTTP daemon 51 includes an application ID-application path correspondence table 53 for corresponding an application ID to an application path, and an application ID-port identification correspondence table 54 for corresponding the application ID to the port identification. As shown in FIG. 7, for example, when an HTTP request is assumed to be "http://xxx.xxx.xxx.xxx:9999/web/user/ja/websys/webArch/mainFrame.c gi", an application path is indicated by "web" part for one layer following "xxx.xxx.xxx.xxx:999" showing a host and a port number. Moreover, "URL path" is shown by a part of "web/user/ja/websys/webArch/mainFrame.cgi" including the application path. When the port number indicated after ":" is a regular port number "80", ":80" is omitted to describe.

The application ID-application path correspondence table 53 is referred to based on the application path indicated in the URL of the HTTP response being received in order to obtain an application ID specifying an application to distribute a process.

In the application ID-port identification correspondence table 54, the port identification is registered by corresponding to the application ID in response to a registration request of the port identification to use conducted from each of the Web application 20 and SDK application 200a. Moreover, the application ID-port identification correspondence table 54 can be referred to when the port identification is obtained from the application ID.

By the above-described mechanisms, the HTTP daemon 51 of the NCS 5f can realize a function for generating the port identification when the HTTP request is distributed.

Next, operations will be described according to the embodiment of the present invention.

First, the Websys 20a of the Web application 20 requests the HTTP daemon 51 of the NCS 5f to register the port identification (for example, HTTP and HTTPS) to use (step S11-1). Similarly, the SDK application 200a requests the HTTP daemon 51 of the NCS 5f to register the port identification (for example, HTTP) to use (step S11-2). It should be noted that an order of registrations is not defined by the step S11-1 and the step S11-2.

The HTTP daemon 51 corresponds the application ID identifying a request originator to the port identification requested to register (step S12). The HTTP daemon 51 obtains the port number based on the port identification from the network service library 24 (step S13) The network service library 24 searches for the port information management file F1 based on the port identification when the network service library 24 receives a port number obtain request from the HTTP daemon 51 (step S14), obtains a port number from the port information management file F1 (step S15), and then informs the port number to the HTTP daemon 51.

Then, the HTTP daemon 51 opens a port specified by the port number which is obtained from the network service library 24 when the port is not opened (step S16). In this case, each of a port "80" for the HTTP and a port "443" for HTTPS is opened.

When each port is opened in step S13, the HTTP daemon 51 updates a port state (step S17). When the network service library 24 receives an update request of the port state from the HTTP daemon 51, the port state of respective port number is changed to be "ACTIVE" in the port information management file F1. In this case, both the port "80" for the HTTP and the port "443" for the HTTPS are changed to be "ACTIVE" in the port information management file F1.

Figure 8:
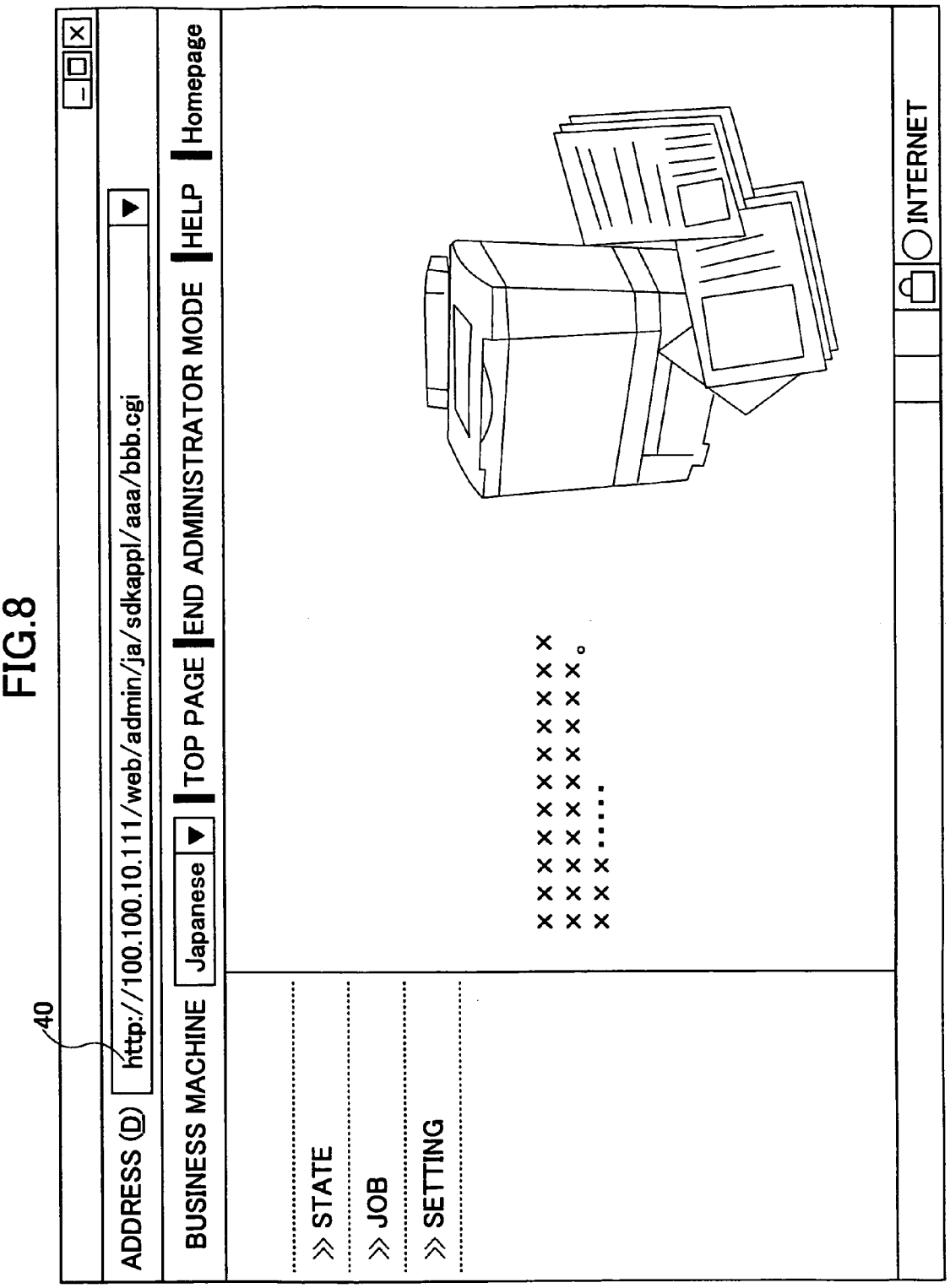
FIG. 8 is a screen example when a port number "80" is used for the HTTP, according to the embodiment of the present invention.

When the HTTP client 9 requests a Web page by using the regular port number "80" with respect to the image forming apparatus 1, for example, an HTTP request as shown in FIG. 8 is sent to the image forming apparatus 1. FIG. 8 is a screen example when the port number "80" is used for the HTTP, according to the embodiment of the present invention. In the screen example shown in FIG. 8, when a user indicates an address 40 showing: "http://100.100.10.111/web/admin/ja/sdkappl/aaa/bbb.cgi" which omits a port number, the port number "80" is normally indicated for the HTTP.

Referring to FIG. 6 again, an HTTP request indicating the address 40 is sent to the image forming apparatus 1 (step S21), the image forming apparatus 1 accepts the HTTP request at the port number "80" (step S22).

The HTTP daemon 51 obtains the port identification from the port number through the network service library 24 (step S23). In this case, the port identification "HTTP" is obtained from the port number "80".

Moreover, the HTTP daemon 51 refers to the application ID-application path correspondence table 53, so as to obtain the application ID from the application path indicated in the HTTP request (step S24). In this case, the application ID "SDKAppl" is obtained from the application path "sdkappl".

Furthermore, the HTTP daemon 51 refers to the application ID-port identification correspondence table 52, so as to confirm a correspondence between the port identification and the application ID, and conducts a relative application by using the application ID (step S25) In this case, the HTTP daemon 51 confirms by referring to the application ID-port identification correspondence table 54 that the application ID "SDKAppl" corresponds to the port identification "HTTP". Since the HTTP request is received at a port identified by the port identification "HTTP", the HTTP daemon 51 conducts the SDK application 200a by using the application ID "SDKAppl".

Figure 9:
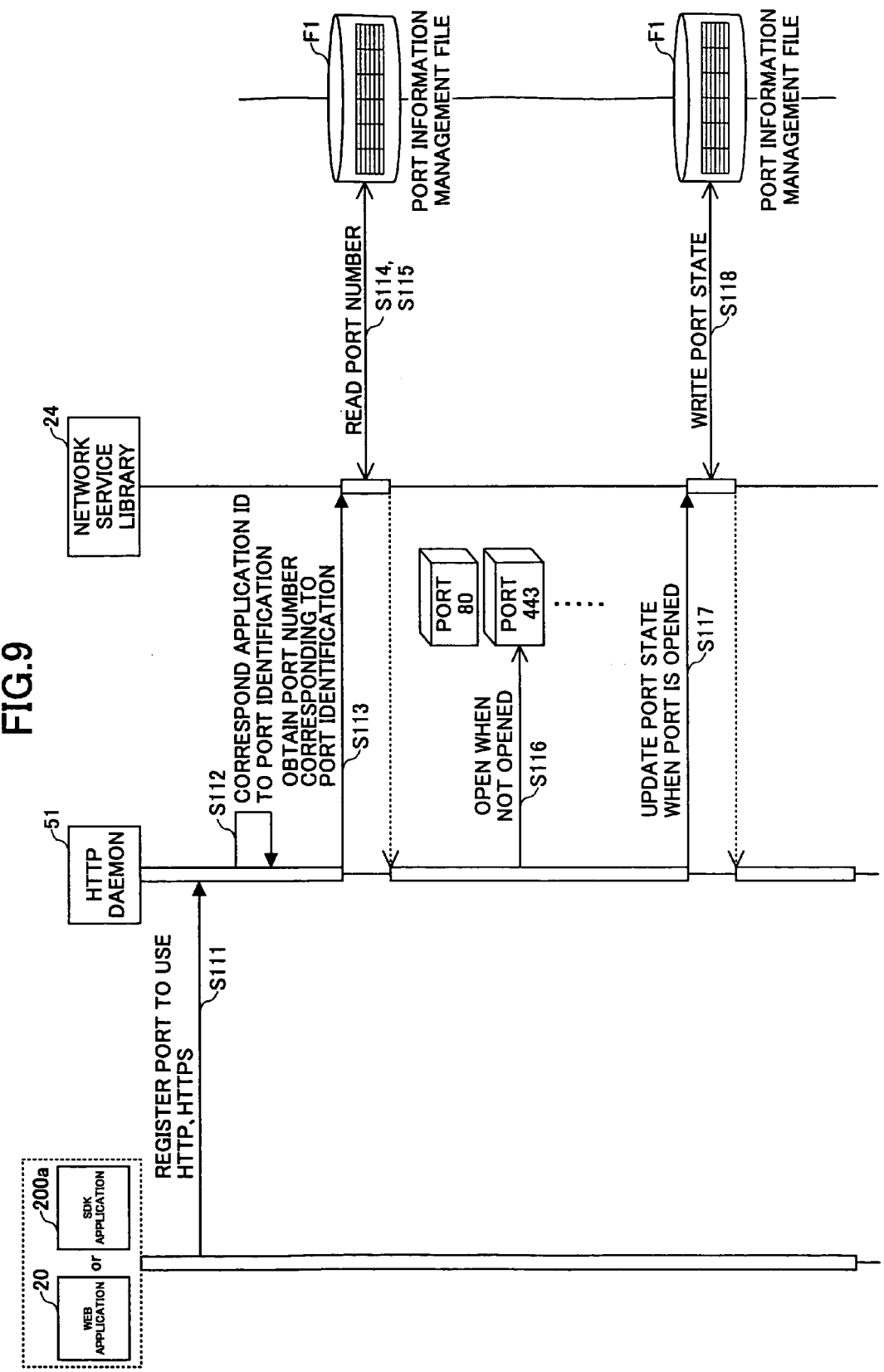
FIG. 9 is a diagram showing a detailed sequence for explaining an operation when the port number "80" is used for the HTTP, according to the embodiment of the present invention.

FIG. 9 is a diagram showing a detailed sequence for explaining the operation when the port number "80" is used for the HTTP, according to the embodiment of the present invention. In FIG. 9, when the Web application 20 and the SDK application 200a request the HTTP daemon 51 to register a port to use, respectively (step S111), the HTTP daemon 51 corresponds the application ID to the port identification to use by using the application ID-port identification correspondence table 54 (step S112).

Furthermore, the HTTP daemon 51 obtains the port number based on the port identification from the network service library 24 (step S113). When the network service library 24 receives the port number obtain request from the HTTP daemon 51, the network service library 24 reads out the port number from the port information management file F1 based on the port identification. That is, the network library 24 searches for the port information management file F1 based on the port identification (step S114), obtains the port number from the port information management file F1 (step S115), and then informs the port number to the HTTP daemon 51.

Then, the HTTP daemon 51 opens when a port specified by the port number obtained from the network service library 24 (step S116). In this case, each of the port "80" for the HTTP and the port "443" for the HTTPS is opened.

When the HTTP daemon 51 opens the ports in step S116, the HTTP daemon 51 updates the port state (step S117) When the network service library 24 receives an update request of the port state from the HTTP daemon 51, the network service library 24 changes the port state of the port number indicated by the update request to be "ACTIVE" in the port information management file F1 (step S118). In this case, the port "80" for the HTTP and the port "443" for the HTTPS are changed to be "ACTIVE".

FIG. 10A is a diagram showing a state of a port information management file before the operation when the port number "80" is used for the HTTP, according to the embodiment of the present invention, and FIG. 10B a diagram showing a state of a port information management file after the operation when the port number "80" is used for the HTTP, according to the embodiment of the present invention. FIG. 10A shows the state of the port information management file F1 in a case in that the port number is read by the network service library 24 in step S114 in FIG. 9. In FIG. 10A, for example, in the port information management file F1, for the port identification "HTTP", the port number field shows "80", the secured field shows "FALSE", the server certificate ID field shows "-" (not set), and the port state field shows "INACTIVE". Moreover, in the port information management file F1, for the port identification "HTTPS", the port number field shows "443", the secured field shows "TRUE", the server certificate ID field shows "0" (zero), and the port state field shows "INACTIVE".

FIG. 10B shows the state of the port information management file F1 in a case in that the port number is written to the port information management file F1 by the network service library 24 in step S118 in FIG. 9. In FIG. 10B, the port state of the port identification "HTTP" is changed from "INACTIVE" to "ACTIVE". Similarly, the port state of the port identification "HTTPS" is changed from "INACTIVE" to "ACTIVE".

Figure 11:
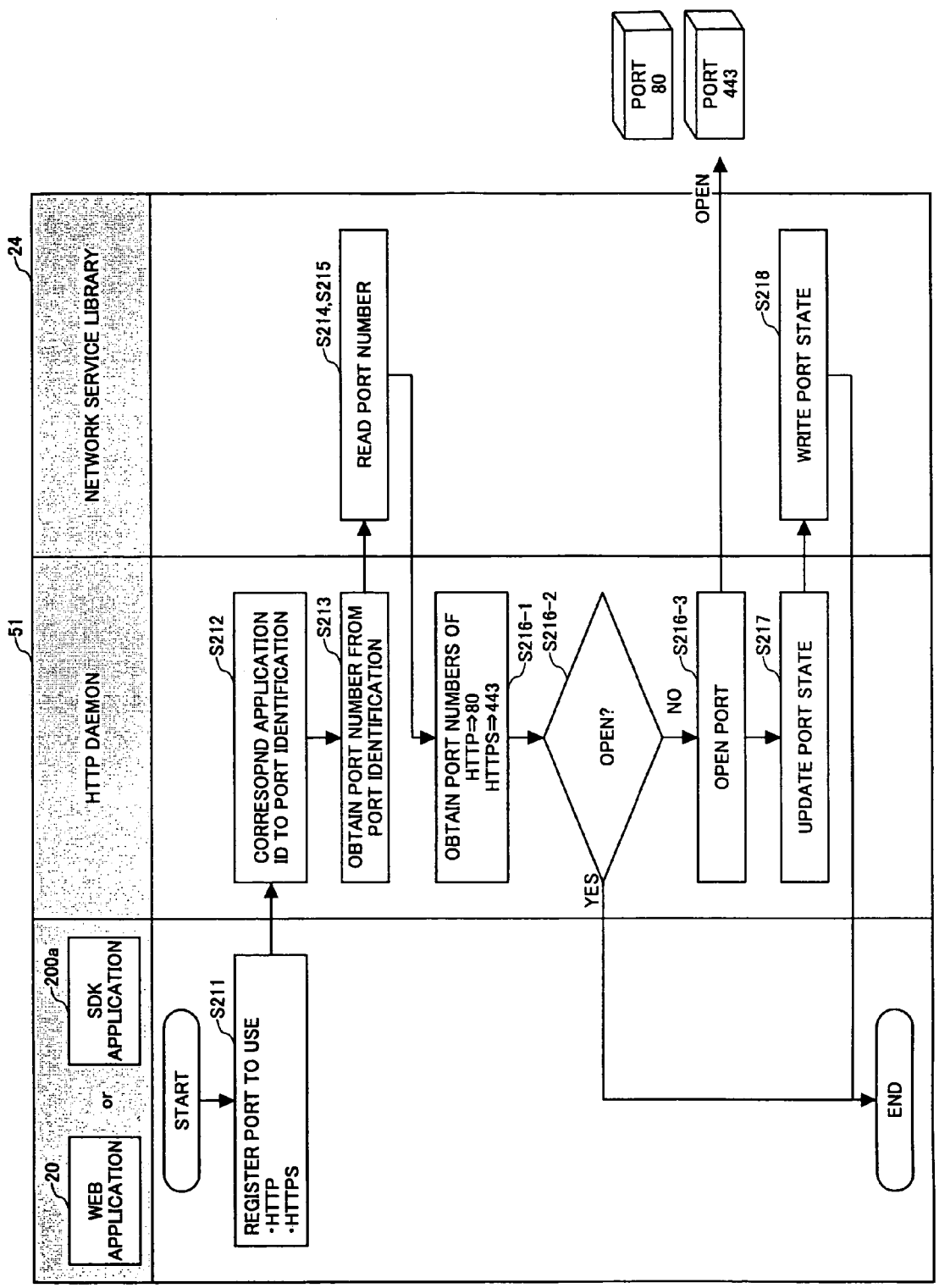
FIG. 11 is a flowchart for explaining the operation in a case of normally using a port number "80" for the HTTP, according to the embodiment of the present invention.

FIG. 11 is a flowchart for explaining the operation in a case of normally using a port number "80" for the HTTP, according to the embodiment of the present invention. In FIG. 11, when the Web application 20 or the SDK application 200a requests the HTTP daemon 51 to register a port to use (step S211), the HTTP daemon 51 corresponds the application ID to the port identification to use by using the application ID-port identification correspondence table 54 (step S212).

Furthermore, the HTTP daemon 51 obtains the port number based on the port identification from the network service library 24 (step S213). When the network service library 24 receives the port number obtain request from the HTTP daemon 51, the network service library 24 reads out the port number from the port information management file F1. That is, the network service library 24 searches for the port information management file F1 based on the port identification (step S214), obtains the port number from the port information management file F1 (step S215), and then informs the port number to the HTTP daemon 51.

The HTTP daemon 51 obtains the port number "80" corresponding to the port identification "HTTP", and also obtains the port number "443" corresponding to the port identification "HTTPS" (step S216-1). The HTTP daemon 51 determines whether or not the ports specified by the port numbers "80" and "443" are opened (step S216-2). When both ports are opened, this operation is terminated.

On the other hand, when the HTTP daemon 51 determines that both ports specified by the port numbers "80" and "443" obtained from the network service library 24 are not opened, the HTTP daemon 51 opens ports "80" and "443" (step S216-3). Next, the HTTP daemon 51 requests the network service library 24 to update each port state of the ports "80" and "443" (step S217).

The network service library 24 writes each port state of the port numbers "80" and "443" to the port information management file F1 (step S218). That is, the network service library 24 changes both port stats of the port numbers "80" and "443" to be "ACTIVE".

In the following, a mechanism for changing the port number for the HTTP, which is opened in the above-described manner, will be described.

Figure 12:
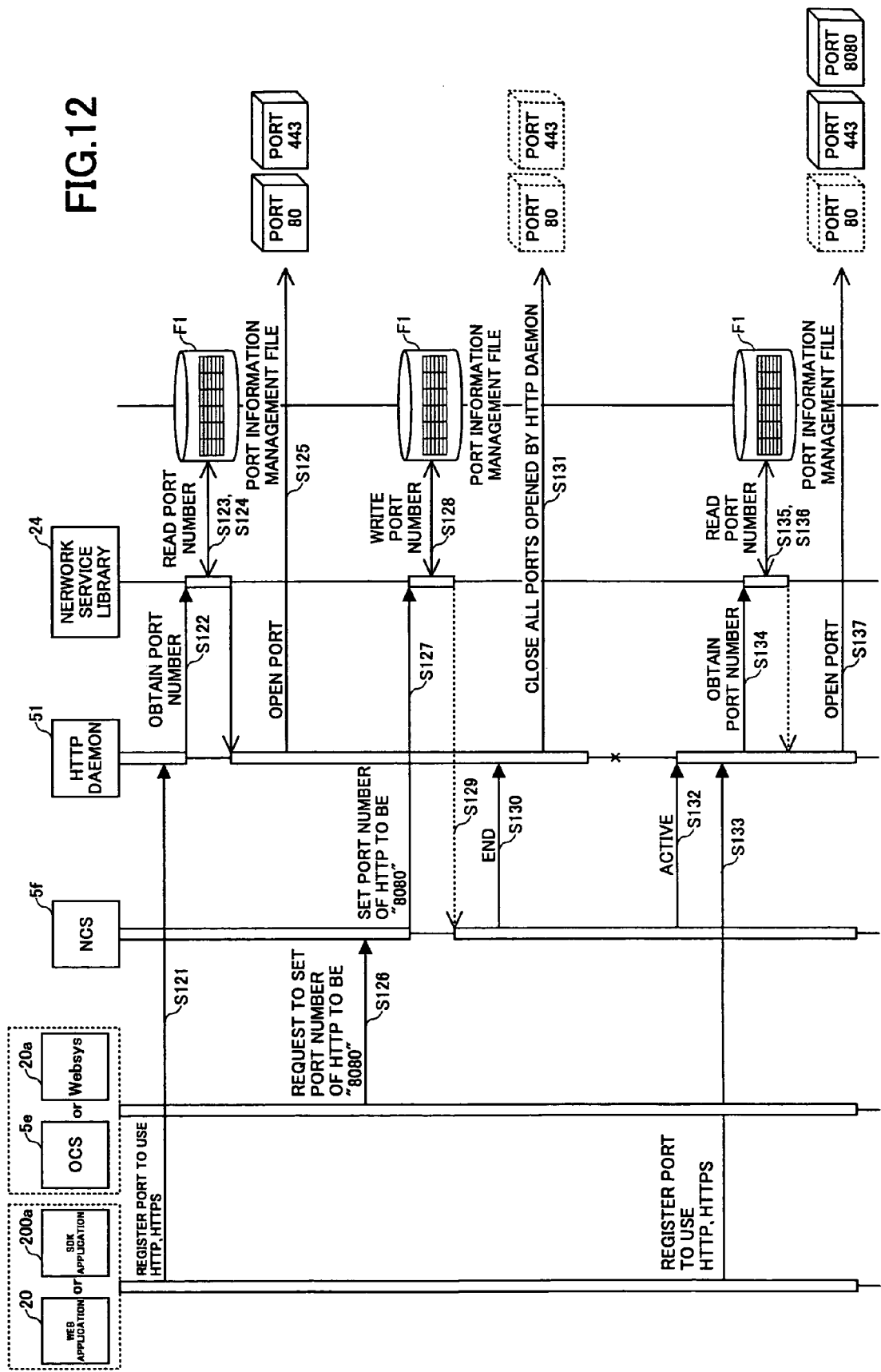
FIG. 12 is a schematic diagram showing a sequence for changing the port number for the HTTP, according to the embodiment of the present invention.

FIG. 12 is a schematic diagram showing a sequence for changing the port number for the HTTP, according to the embodiment of the present invention. In FIG. 12, the port to use is registered by the Web application 20 or the SDK application 200a, and the port number for the HTTP is changed by the OCS 5e or the Websys 20a. When the port number for the HTTP is changed by the OCS 5e, the port number is changed by an operation of the user at the operation panel of the image forming apparatus 1. On the other hand, when the port number for the HTTP is changed by the Websys 20a, the port number is changed in response to the HTTP request sent from the HTTP client 9 connecting to the image forming apparatus 1 through the network 10. The same process is conducted for these cases, and a case of the Web application 20 and the OCS 5e will be described with reference to FIG. 12.

In FIG. 12, the Web application 20 requests the HTTP daemon 51 to register a port to use by using the port identification (step S121). For example, the Web application 20 registers the port identification "HTTP" and the port identification "HTTPS".

The HTTP daemon 51 requests the network service library 24 to obtain the port number (step S122). In this case, the HTTP daemon 51 requests each port number of the port identification "HTTP" and the port identification "HTTPS", respectively.

The network service library 24 reads the port numbers corresponding the port identification "HTTP" and the port identification "HTTPS" from the port information management file F1. That is, the network service library 24 searches for the port information management file F1 based on the port identification (step S123), obtains each port number from the port information management file F1 (step S124), and then informs each port number to the HTTP daemon 51. In this case, the port number "80" corresponding to the port identification "HTTP" and the port number "443" corresponding to the port identification "HTTPS" are informed to the HTTP daemon 51.

The HTTP daemon 51 opens the port "80" and the port "443" (step S125).

The OCS 5e requests the NCS 5f to set the port number corresponding to the port identification "HTTP" to be "8080" (step S126). The NCS 5f requests the network service library 24 to set the port number corresponding to the port identification "HTTP" to be "8080" (step S127) The network service library 24 writes "8080" as the port number corresponding to the port identification "HTTP" that is managed in the port information management file F1 (step S128). Accordingly, the port number corresponding to the port identification "HTTP" is changed from "80" to "8080".

When the NCS 5f receives a notification indicating an end of writing the port number from the network service library 24 (step S129), the NCS 5f informs the end of writing the port number to the HTTP daemon 51 (step S130). The HTTP daemon 51 closes all ports opened by the HTTP daemon 51 (step S131). In this case, the port "80" for the HTTP and the port "8080" for the HTTPS are closed.

Next, the NCS 5f activates the HTTP daemon 51 (step S132). Also, the Web application 20 requests the HTTP daemon 51 to register a port to use, by using the port identification (step S133).

The HTTP daemon 51 requests the network service library 24 to obtain the port number (step S134). In this case, the HTTP daemon 51 requests port numbers corresponding to the port identification "HTTP" and the port identification "HTTPS", respectively.

The network service library 24 reads the port numbers corresponding to the port identification "HTTP" and the port identification "HTTPS", respectively, from the port information management file F1. That is, the network service library 24 searches for the port information management file F1 based on the port identification (step S135), obtains each port number from the port information management file F1 (step S136), and then informs each port number to the HTTP daemon 51. In this case, the port number "8080" corresponding to the port identification "HTTP" and the port number "443" corresponding to the port identification "HTTPS" are informed to the HTTP daemon 51.

The HTTP daemon 51 opens the port "8080" and the port "443" (step S137). In this case, the port "8080" is newly opened for the HTTP, and the port "443" closed in step S131 is opened for the HTTPS.

A case, in which the user changes the port number for the HTTP by using the Web browser of the HTTP client 9, will be described with reference to FIG. 13.

Figure 13:
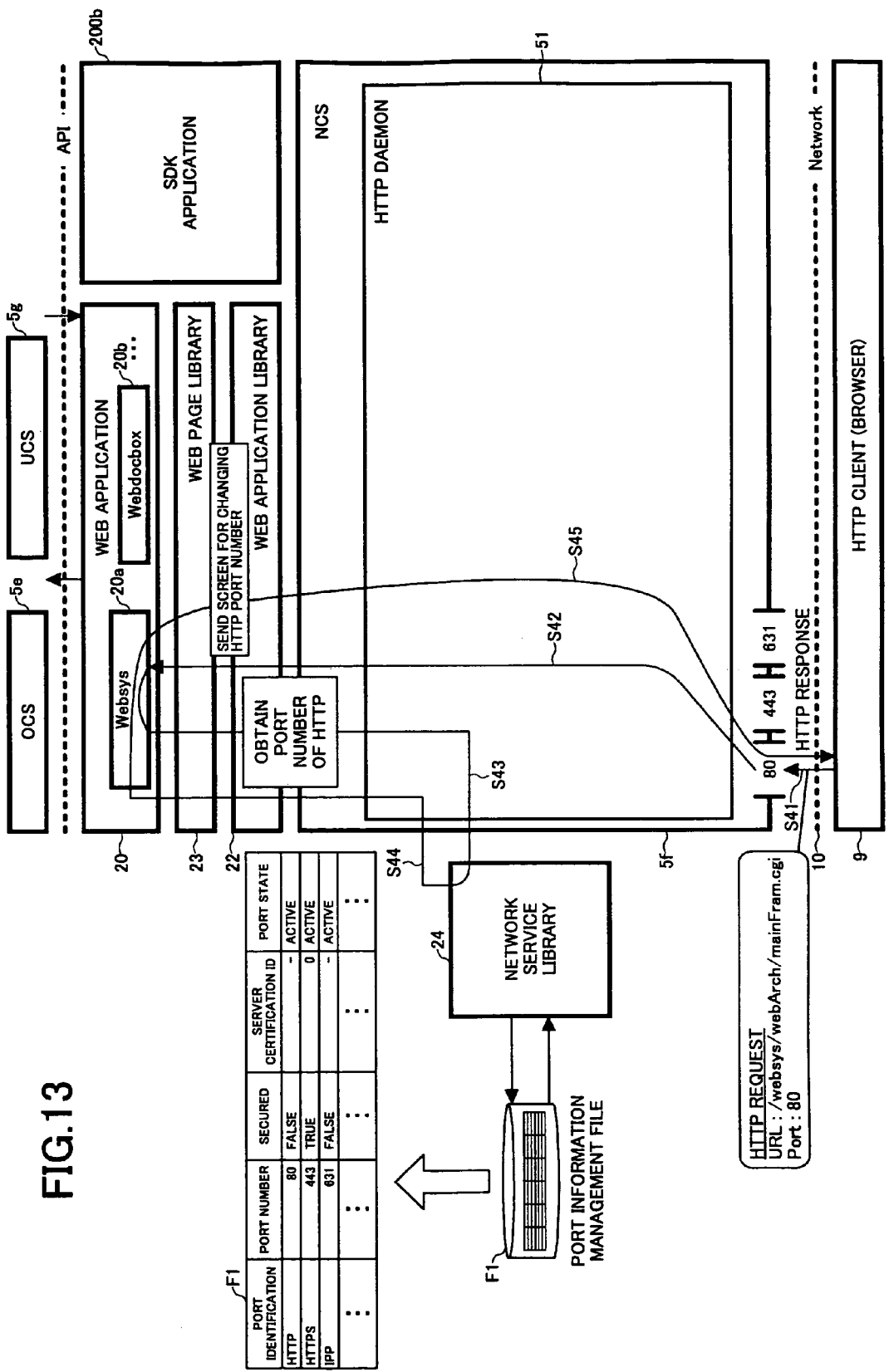
FIG. 13 is a diagram for explaining an operation in a case of providing a screen for changing the port number, according to the embodiment of the present invention.

FIG. 13 is a diagram for explaining an operation in a case of providing a screen for changing the port number, according to the embodiment of the present invention. In FIG. 13, the user sends an HTTP request for requesting a screen for setting (changing) the port number by indicating the port "80" being normally used at the HTTP client 9 (step S41).

When the HTTP request is received at the port "80" from the HTTP client 9, the NCS 5f distributes a process to the Websys 20a through the Web application library 22 and the Web page library 23 (step S42). The Websys 20a sends a port number obtain request for requesting a current port number for the HTTP to the NCS 5f (step S43). When the port number obtained from the port information management file F1 by the network service library 24 is informed from the network service library 24, the Websys 20a creates an HTTP port number change screen displaying the current port number for the HTTP, and then the HTTP port number change screen is provided as an HTTP response to the HTTP client 9 through the NCS 5f (step S45).

A state shown in FIG. 5, in which the port state is obtained by the Websys 20a, is described above.

Figure 14:
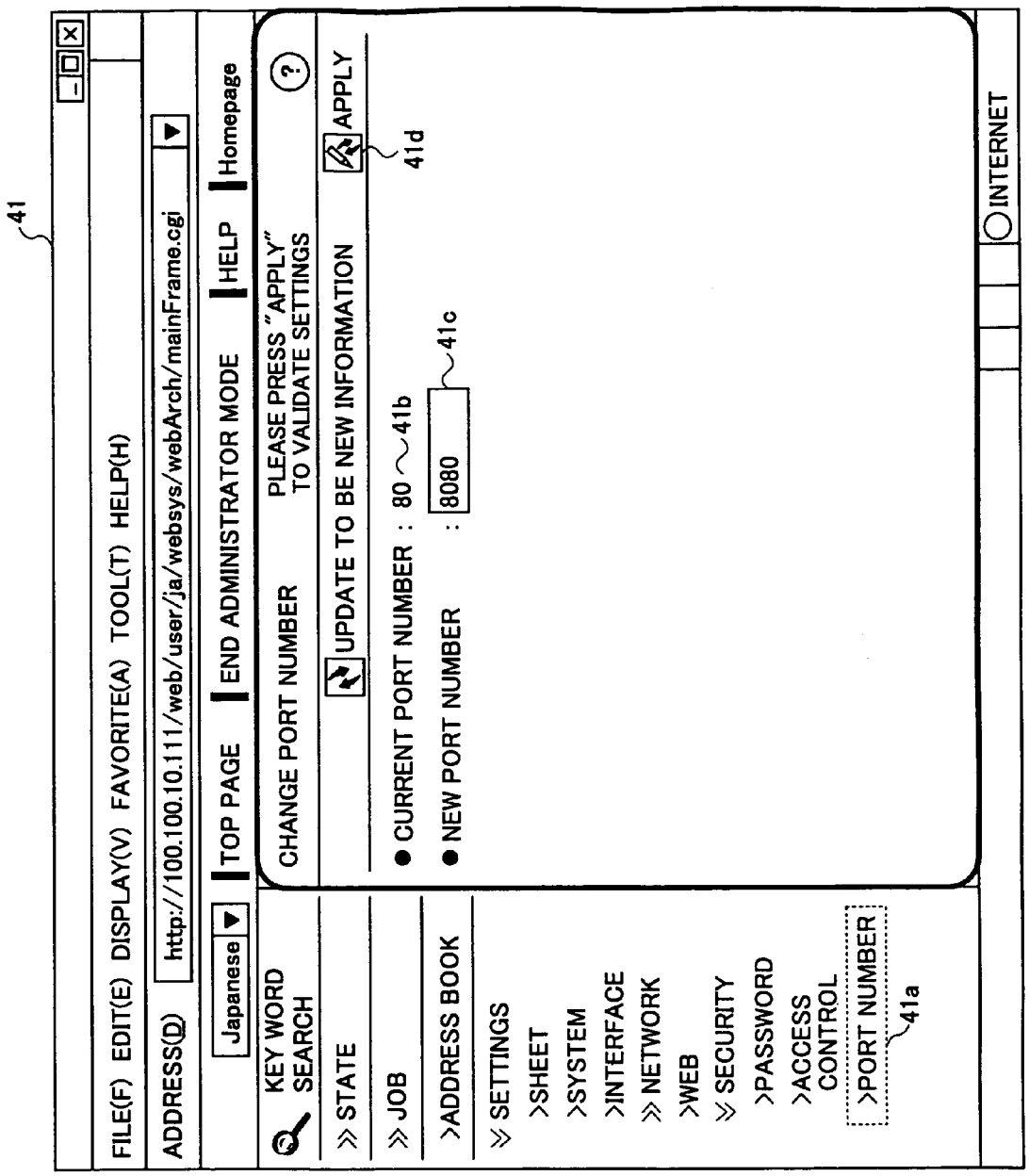
FIG. 14 is a diagram showing an example of the HTTP port number change screen, according to the embodiment of the present invention.

For example, the HTTP port number change screen provided to the HTTP client 9 as described above is displayed at the HTTP client 9 as shown in FIG. 14. FIG. 14 is a diagram showing an example of the HTTP port number change screen, according to the embodiment of the present invention.

In the HTTP port number change screen 41 shown in FIG. 14, when the user selects (or clicks by a mouse or a like) "port number" 41a from a menu (step S41 in FIG. 13), a current port number display area 41b and a new port number setting area 41c are displayed. In this case, the current port number display area 41b shows "80" before the port number is changed. For example, when the user sets "8080" to the new port number setting area 41c and clicks an apply button 41d, an operation shown in FIG. 15 is conducted.

Figure 15:
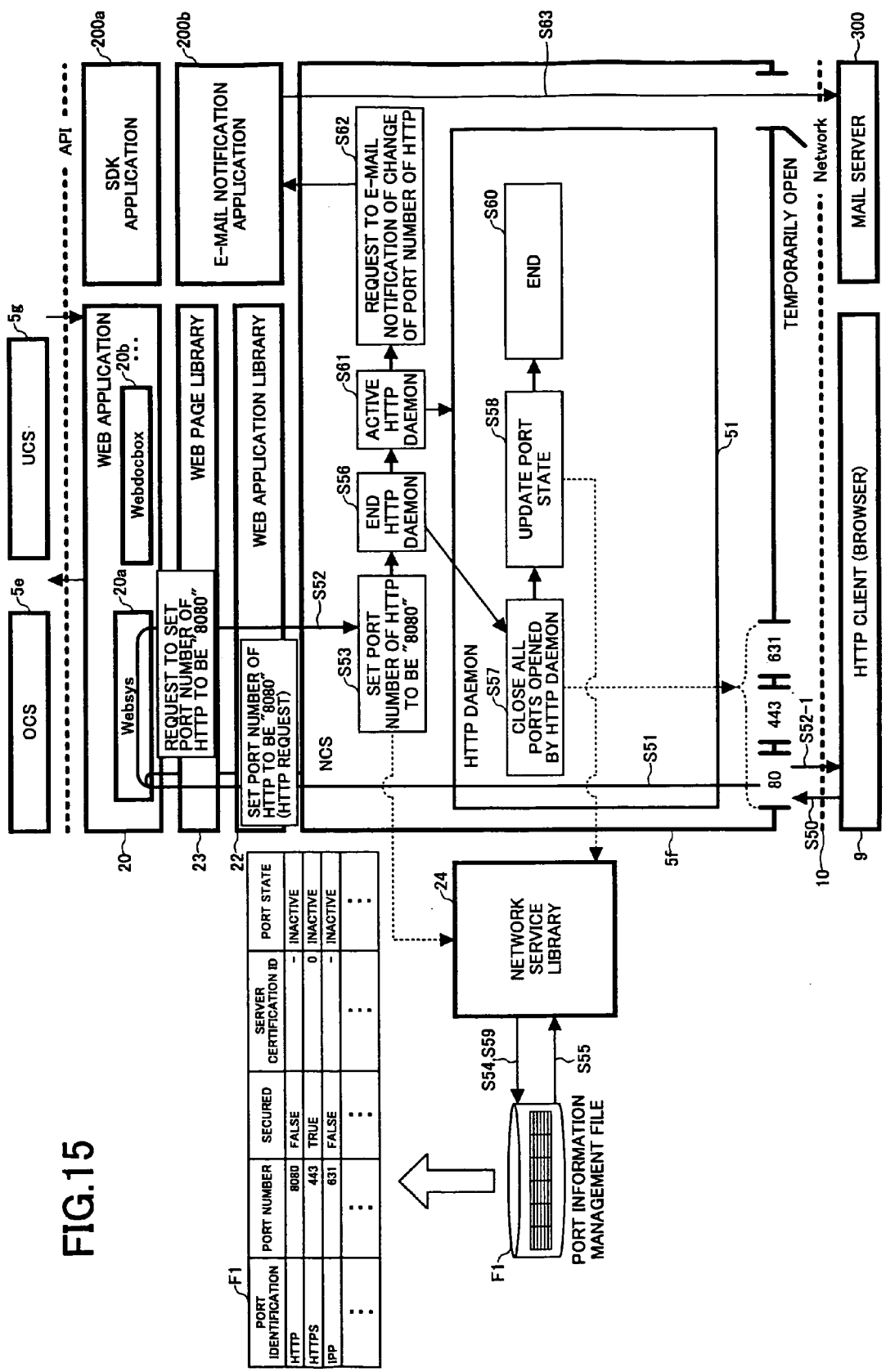
FIG. 15 is a diagram explaining for an operation in a case of changing the port number, according to the embodiment of the present invention.

FIG. 15 is a diagram for explaining an operation in a case of changing the port number, according to the embodiment of the present invention. In FIG. 15, when the OCS 5e receives the HTTP request for setting the port number at the port "80" from the HTTP client 9 (step S50), the OCS 5e distributes a process for setting the port number for the HTTP to be "8080" to the Websys 20a through the Web application library 22 and the Web page library 23 (step S51).

The Websys 20a requests the NCS 5f to set the port number identified by the port identification "HTTP" to be "8080" (step S52). When the NCS 5f receives a port number setting request from the Websys 20a, the NCS 5f requests the network service library 24 to set the port number of the port identification "HTTP" to be "8080" (step S53). The Websys 20a creates a screen displaying an address for the port number set to be "8080", and sends the screen displaying the changed address to the HTTP client 9 (step S52-1).

When the network service library 24 receives the port number setting request, the network service library 24 searches for the port information management file F1 based on the port identification "HTTP" (step S54), and sets (changes) the port number corresponding to the port identification "HTTP" (step S55).

On the other hand, the NCS 5f instructs the HTTP daemon 51 to end the operation (step S56) When the HTTP daemon 51 receives an instruction of the end of the operation in step S56, the HTTP daemon 51 closes all ports being opened by the HTTP daemon 51 (step S57). Subsequently, the HTTP daemon 51 requests the network service library 24 to update the port state (step S58). The network service library 24 refers to the port information management file F1 and changes the port state showing "ACTIVE" to be "INACTIVE" (step S59). After that, the operation of the HTTP daemon 51 ends (step S60).

After the operation of the HTTP daemon 51 ends, the NCS 5f activates the HTTP daemon 51 again (step S61). In addition, the NCS 5f requests the e-mail notification application 200b to inform a user to change the port number for the HTTP (step S62).

The e-mail notification application 200b obtains a plurality of e-mail addresses of users, who are registered to the image forming apparatus 1, from the UCS 5g, sets the plurality of e-mail addresses as destinations, and sends e-mails informing the change of the port number from a port that is temporarily opened for an e-mail transmission (step S63). The e-mails sent to the plurality of users are collected to a predetermined mail server 300 through the network 10, and distributed to the destinations.

For a user who changed the settings of the port number, a screen displaying an address in which the port number is changed to be "8080" is displayed at the HTTP client 9. In addition, for a plurality of users of the image forming apparatus 1, the address in which the port number is changed to be "8080" is informed by e-mail. Therefore, it is possible to certainly inform the address for a changed port number to the plurality of users using the image forming apparatus 1.

Figure 16:
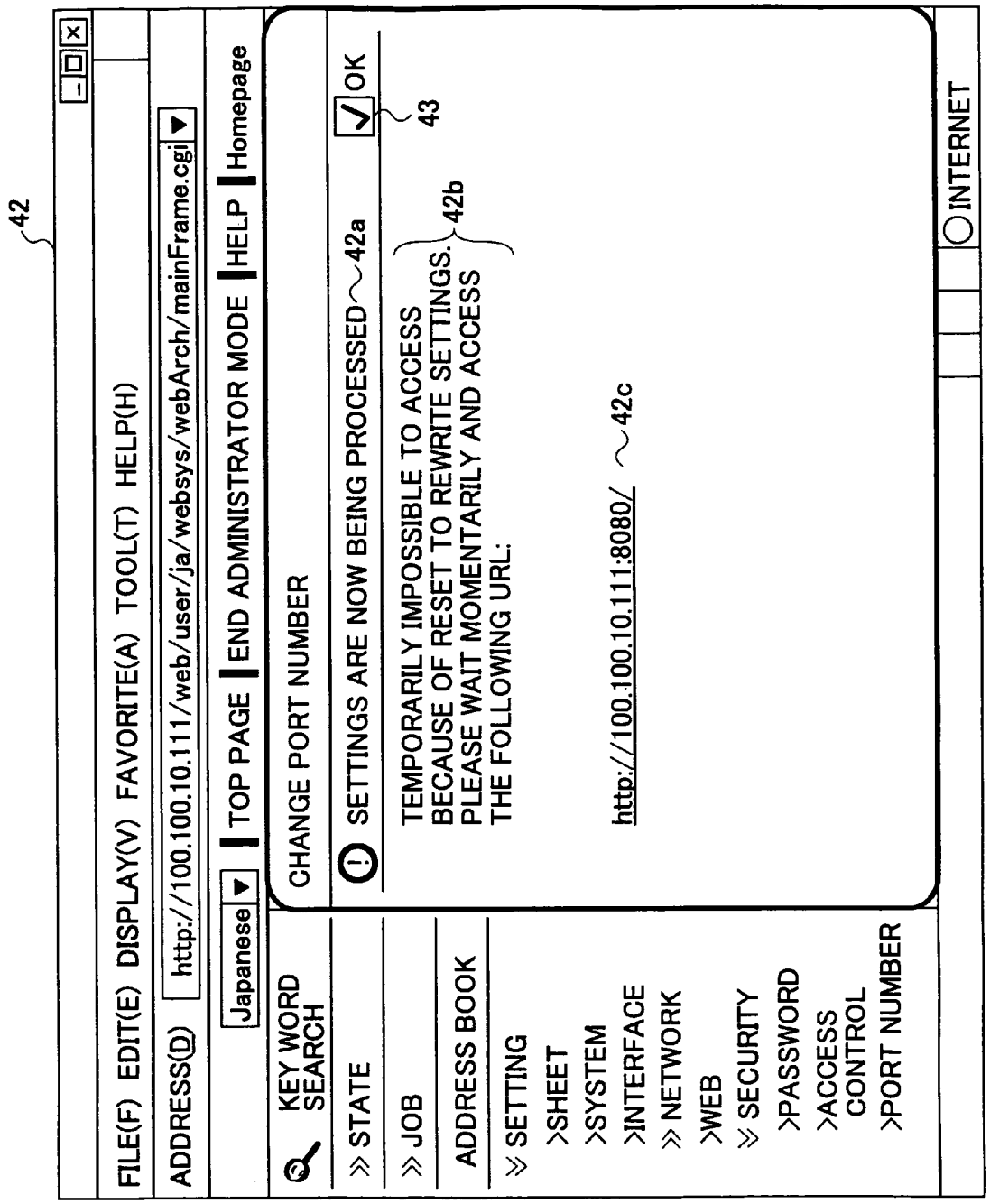
FIG. 16 is a diagram showing an example, of the screen showing the changed port number, according to the embodiment of the present invention.

For example, the screen displaying the address for the changed port number "8080" is displayed at the HTTP client 9 as shown in FIG. 16.

FIG. 16 is a diagram showing an example, of the screen showing the changed port number, according to the embodiment of the present invention. In the screen 42 shown in FIG. 16, a message area 42a displays that settings of the port number are being processed by the image forming apparatus 1, a message area 42b displays a message regarding the address for the changed port number, and an address display area 42c displays the address for the changed port number.

For example, the message area 42a displays a message such as "SETTINGS ARE NOW BEING PROCESSED" or a like. For example, the message area 42c displays a message such as "http://100.100.10.111:8080/" or a like. Accordingly, the address is displayed so that the port number "8080" is additionally provided after a host "100.100.10.111".

After that, the user sends the HTTP request to the image forming apparatus 1 by using the address for the changed port number. For example, when the user accesses the address, the user may add the address to "FAVORITE" of the Web browser, and the user can easily accesses in the future.

FIG. 17 is a diagram showing an example of an e-mail informing the address for the changed port number, according to the embodiment of the present invention. In FIG. 17, the e-mail 43 shows a title 43a, a message 43b showing a message informing the address for the changed port number, and the address display area 42c displaying the address for the changed port number.

For example, the title 43a such as "NOTICE FROM ADMINISTRATOR" prompts the user to read the e-mail 43. For example, the message 43b shows a purpose of the e-mail 43 by "SERVER SETTINGS ARE CHANGED. PLEASE ACCESS THE FOLLOWING ADDRESS IN THE FUTURE;". For example, the address display area 43c displaying such as "http://100.100.10.11:8080/". The address is displayed so that the port number "8080" is additionally provided after a host "100.100.10.11".

After that, the user sends the HTTP request to the image forming apparatus 1 by using the address for the changed port number. For example, when the user accesses the address, the user may add the address to "FAVORITE" of the Web browser, and the user can easily accesses in the future.

By informing the address for the changed port number in this manner, it is possible to inform the address for the changed port number to all the plurality of users using the image forming apparatus 1.

Figure 18:
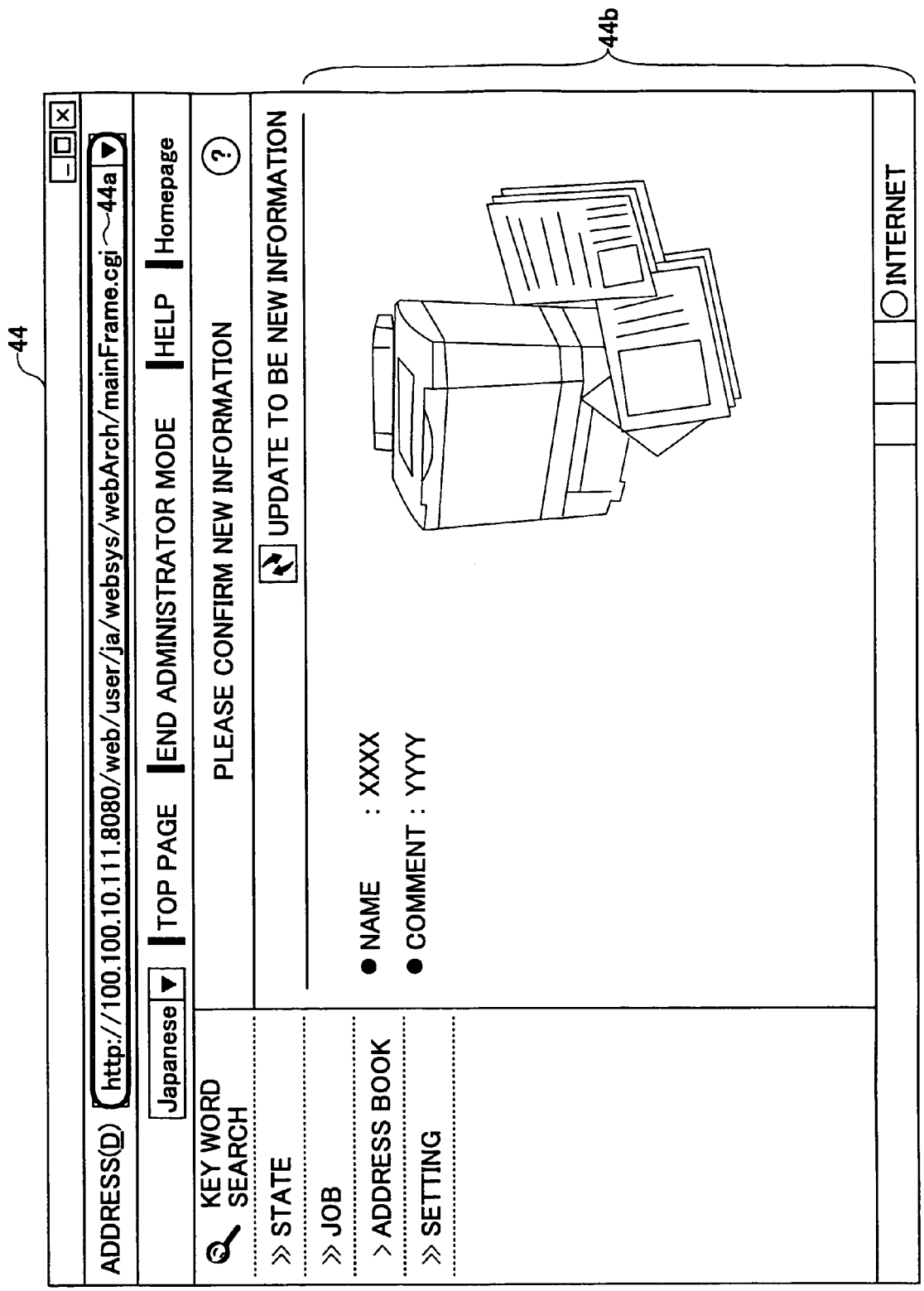
FIG. 18 is a diagram showing an example of a screen in a case of using an address indicating the changed port number, according to the embodiment of the present invention.

For example, a screen, which is displayed in a case of using the address in the address display area 42c in FIG. 16 or the address in the address display area 43c in FIG. 17, is displayed as shown in FIG. 18. FIG. 18 is a diagram showing an example of a screen in a case of using an address indicating the changed port number, according to the embodiment of the present invention.

In the screen 44 shown in FIG. 18, for example, when the user indicates an address 44a showing "http://100.100.10.111:8080/web/user/ja/websys/webArch/mainframe.cgi", information is normally displayed in an information display area 44b through the port "8080".

Next, an operation for setting (changing) the port number for the HTTP from the operation panel 113 of the image forming apparatus 1 will be described with reference to FIG. 19 and FIG. 20.

Figure 20A:
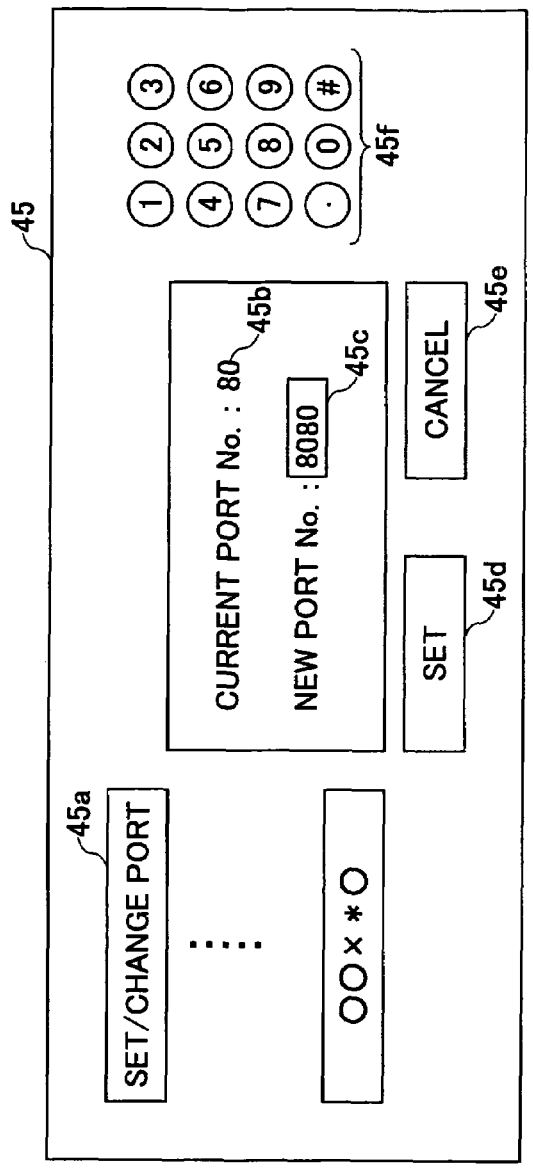
FIG. 20A is a diagram showing an example of a port setting screen displayed at the operation panel, according to the embodiment of the present invention.

FIG. 19 is a diagram for explaining the operation in a case of setting the port number by using the operation panel 113, according to the embodiment of the present invention. In FIG. 19, for example, the user changes the port number at a screen displayed at the operation panel 113 as shown in FIG. 20A (step S71).

Figure 20B:
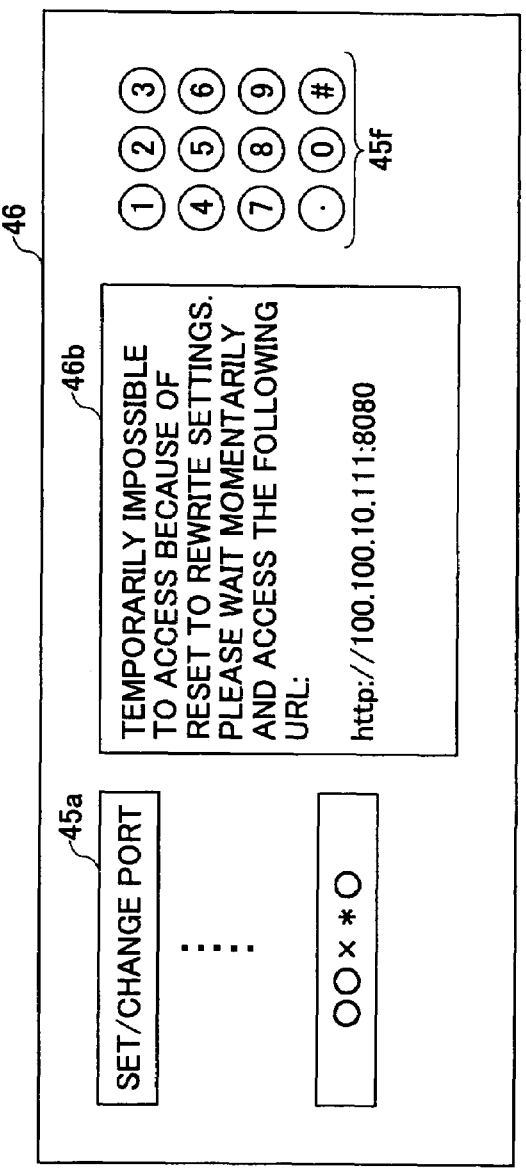
FIG. 20B is a diagram showing an example of the port change notification screen displayed at the operation panel, according to the embodiment of the present invention.

An example of a screen displayed at the operation panel 113 possible to set the port number will be described with reference to FIG. 20A and FIG. 20B. FIG. 20A is a diagram showing an example of a port setting screen displayed at the operation panel 113, according to the embodiment of the present invention. In the screen 45 shown in FIG. 20A, when the user selects a button 45a for setting or changing the port number, "80" is displayed at a display area 45b for displaying a current port number, and also an input area 45c for inputting a new port number is displayed. The user inputs a desired port number into an input area 45c by using a ten-key 45f. Then, when the user sets the new port number, the user selects a "SET" button 45d. On the other hand, in a case of canceling the settings for the new port number, the user selects a "CANCEL" button 45e.

Accordingly, when the user inputs and sets "8080" as the new port number and selects "SET" button 45d, the new port number "8080" for the HTTP is informed to the OCS 5e. That is, the OCS 5e requests the NCS 5f to set the port number "8080" of the port identification "HTTP" (step S72). Also, the OCS 5e displays a screen as shown in FIG. 20B at the operation panel 113. FIG. 20B is a diagram showing an example of the port change notification screen displayed at the operation panel 113, according to the embodiment of the present invention. In FIG. 20B, parts that are the same as those shown in the screen 45 in FIG. 20A are given the same reference numbers, and the explanation thereof will be omitted. In the screen 46 shown in FIG. 20B, for example, a display area 46 displays a message such as "TEMPORARILY IMPOSSIBLE TO ACCESS BECAUSE OF RESET TO REWRITE SETTINGS. PLEASE WAIT MOMENTARILY AND ACCESS THE FOLLOWING URL: http://100.100.10.11:8080". By this message, the user can confirm that the address is changed to request a process to the image forming apparatus 1 through the network 10 or 10b.

The NCS 5f requests the network service library 24 to set the port number of the port identification "HTTP" to be "8080" (step S73). The network service library 24 searches for the port information management file F1 based on the port identification "HTTP", and rewrites a value 45g of the port number corresponding to the port identification "HTTP" to be "8080" (step S75). After that, the NCS 5f instructs the HTTP daemon 51 to end the process (step S76).

The daemon 51 closes all ports opened by the HTTP daemon 51 (step S77), and requests the network service library 24 to update the port state (step S78). The network service library 24 changes a relative port state to be "INACTIVE" (step S79). Then, the HTTP daemon 51 ends the operation (step S80).

After that, the NCS 5f activates the HTTP daemon 51 again (step S81), and requests the HTTP daemon 51 to send an e-mail informing the port number for the HTTP (step S82).

The e-mail notification application 200b obtains a plurality of e-mail addresses of users, who are registered to the image forming apparatus 1, from the UCS 5g, sets the plurality of e-mail addresses as destinations, and sends e-mails informing the change of the port number from a port that is temporarily opened for an e-mail transmission (step S83). The e-mails sent to the plurality of users are collected to a predetermined mail server 300 through the network 10, and distributed to the destinations. The e-mail sent in step S82 is the same as the example of the e-mail shown in FIG. 17.

Accordingly, it is possible to inform the change of the address to the plurality of users who use the image forming apparatus 1.

Figure 21:
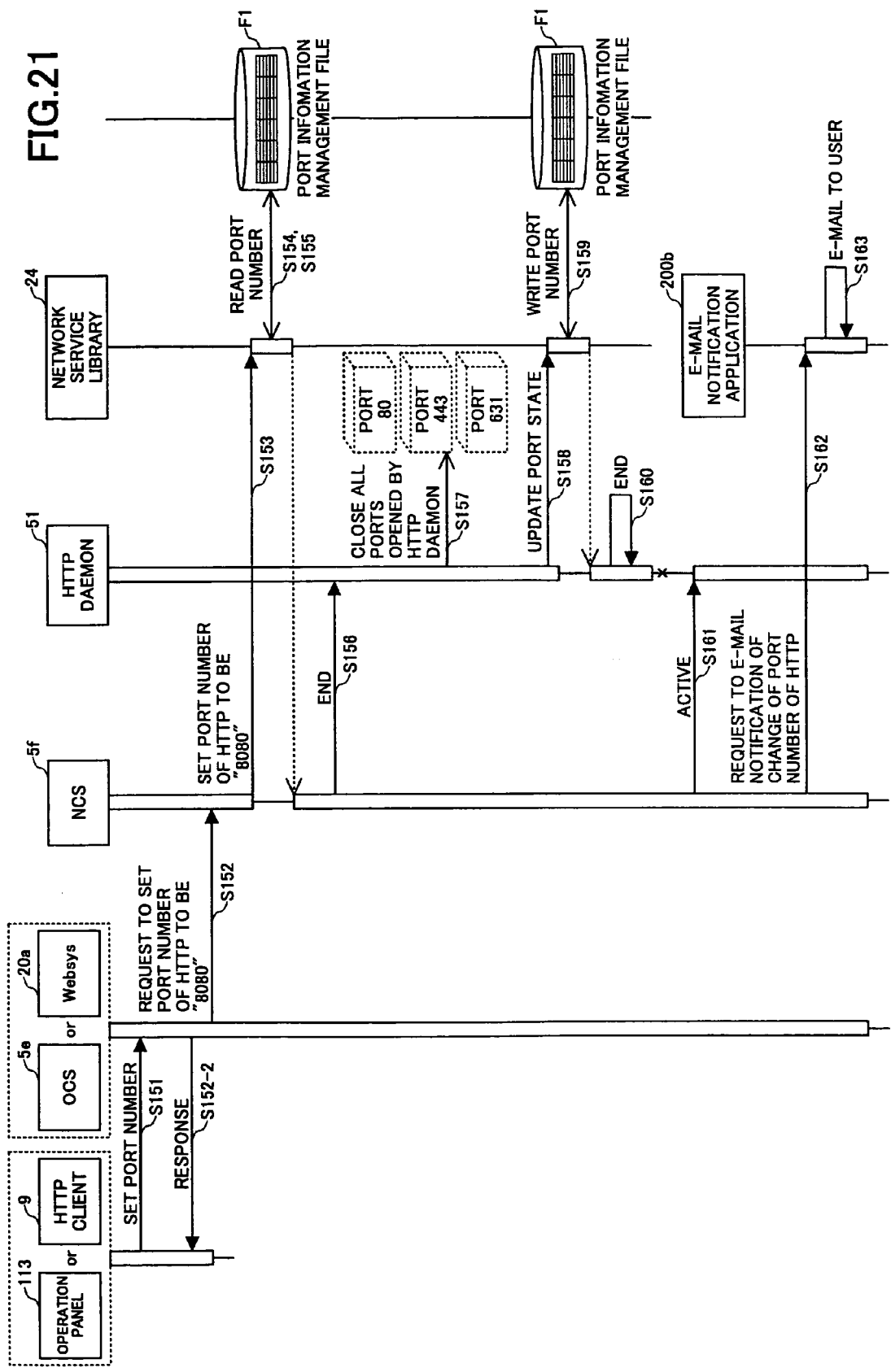
FIG. 21 is a diagram showing an operation in a case of setting the port number, according to the embodiment of the present invention.

FIG. 21 is a diagram showing an operation in a case of setting the port number, according to the embodiment of the present invention. In FIG. 21, when the OCS 5e receives a port number setting request from the operation panel 113 (step S151), the OCS 5e returns a response for the request (step S152-2) The OCS 5e requests the NCS 5f to set the port number of the port identification "HTTP" to be "8080" (step S152). Similarly, when the Websys 20a receives the port number setting request from the HTTP client 9 (step S151) the Websys 20a returns a response for the port number setting request (step S152-2). The Websys 20a requests the NCS 5f to set the port number of the port identification "HTTP" to be "8080" (step S152).

When the NCS 5f receives a port number setting request from the Websys 20a, the NCS 5f requests the network service library 24 to set the port number of the port identification "HTTP" to be "8080" (step S153).

When the network service library 24 receives the port number setting request, the network service library 24 writes "8080" as the port number corresponding to the port identification "HTTP". That is, the network service library 24 searches for the port information management file F1 based on the port identification "HTTP" (step S154), and sets (changes) the port number corresponding to the port identification "HTTP" to be "8080" (step S155).

On the other hand, the NCS 5f instructs the HTTP daemon 51 to end the operation of the HTTP daemon 51 (step S156). When the HTTP daemon 51 receives an end instruction in step S156, the HTTP daemon 51 closes all ports previously opened by the HTTP daemon 51 (step S157). Subsequently, the HTTP daemon 51 requests the network service library 24 to update the port state (step S158). The network service library 24 writes the port state. That is, the network service library 24 refers to the port information management file F1, and changes the port state showing "ACTIVE" to be "INACTIVE" (step S159). After that, the HTTP daemon 51 ends the operation of the HTTP daemon 51 (step S160).

When the HTTP daemon 51 ends the operation of the HTTP daemon 51, the NCS 5f activates the HTTP daemon 51 again (step S161). Then, the NCS 5f requests the e-mail notification application 200b to inform the change of the port number for the HTTP by e-mail (step S162).

The e-mail notification application 20b obtains e-mail addresses of the plurality of users, who are registered to the image forming apparatus 1, from the UCS 5g, sets the plurality of e-mail addresses as destinations, and sends e-mails informing the change of the port number from a port that is temporarily opened for an e-mail transmission (step S163).

A state transition of the port information management file F1 by the operation in the case of setting the port number for the HTTP will be described with reference to FIG. 22A, FIG. 22B, and FIG. 22C. FIG. 22A is a diagram showing a state of the port information management file before the port number is changed by the network service library in steps S154 and S155 in FIG. 21, according to the embodiment of the present invention. In the port information management file F1 in FIG. 22A, for example, for the port identification "HTTP", the port number field shows "80", the secured field shows "-" (not set), and the port state field shows "ACTIVE". Moreover, for the port identification "HTTPS", the port number field shows "443", the secured field shows "TRUE", the server certificate ID field shows "0" (zero), and the port state field shows "ACTIVE".

FIG. 22B is a diagram showing the state of the port information management file after the port number is changed by the network service library in steps S154 and S155 in FIG. 21, according to the embodiment of the present invention. In FIG. 22B, the port number of the port identification "HTTP" is changed from "80" to "8080".

FIG. 22C is a diagram showing the state of the port information management file after the port state is written by the network service library in step S159 in FIG. 21, according to the embodiment of the present invention. In FIG. 22C, the port state of the port identification "HTTP" is changed from "ACTIVE" to "INACTIVE". Similarly, the port state of the port identification "HTTPS" is changed from "ACTIVE" to "INACTIVE".

Figure 23:
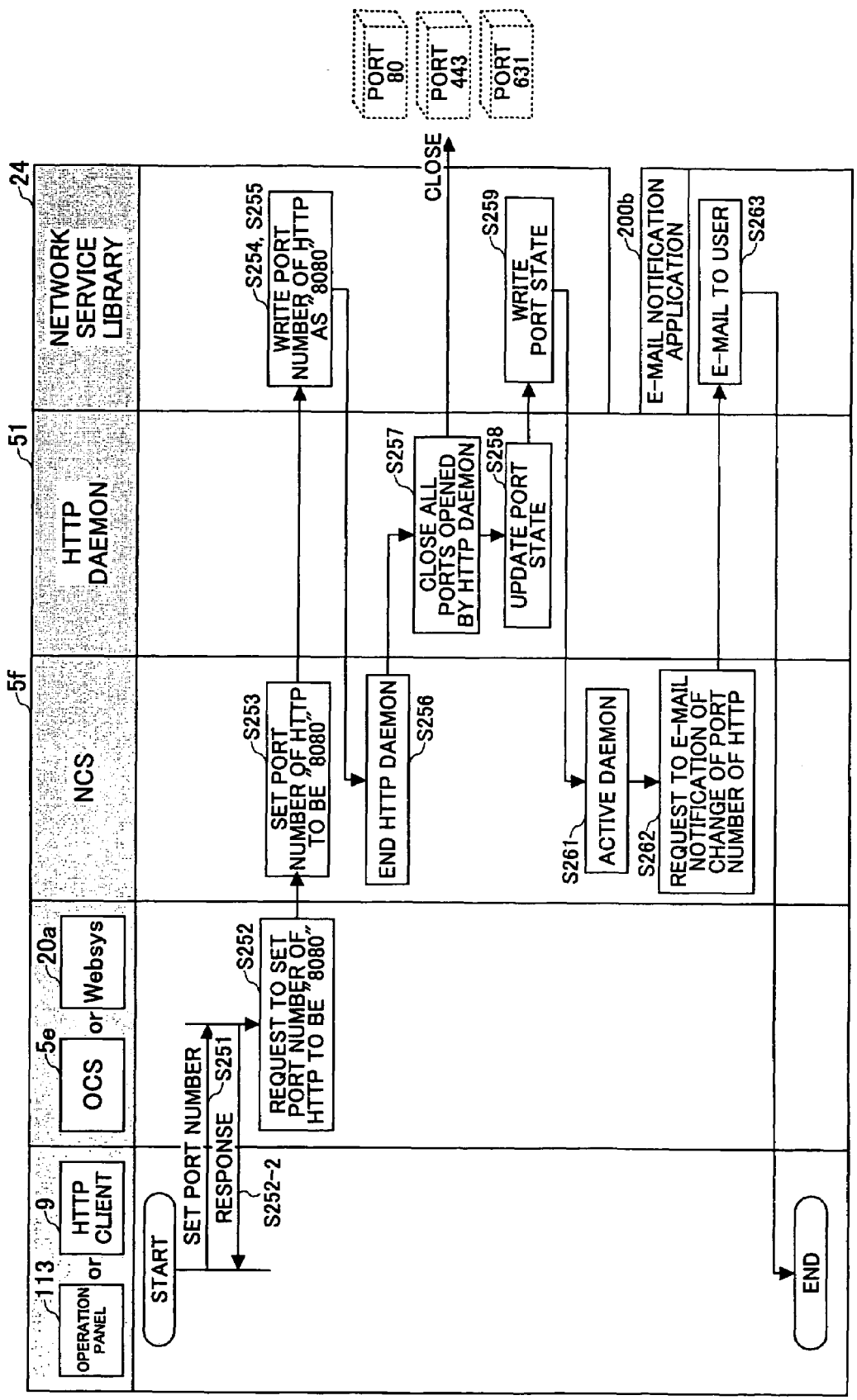
FIG. 23 is a flowchart for explaining the operation in the case of changing the port number, according to the embodiment of the present invention.

FIG. 23 is a flowchart for explaining the operation in the case of changing the port number, according to the embodiment of the present invention. In FIG. 23, when the OCS 5e receives a port number setting request from the operation panel 113 (step S251), the OCS 5e returns a response for the port number setting request (step S252-2). The OCS 5e requests the NCS 5f to set the port number of the port identification "HTTP" to be "8080" (step S252). Similarly, when the NCS 5f receives the port number setting request from the HTTP client 9 (step S251), the Websys 20a returns a response for the port number setting request (step S252-2). The Websys 20a requests the NCS 5f to set the port number of the port identification "HTTP" to be "8080" (step S252).

When the NCS 5f receives a port number setting request, the NCS 5f requests the network service library 24 to set the port number of the port identification "HTTP" to be "8080" (step S253).

When the network service library 24 receives the port number setting request, the network service library 24 writes "8080" as the port number corresponding to the port identification "HTTP". That is, the network service library 24 searches for the port information management file F1 based on port identification "HTTP" (step S254), and sets (changes) the port number corresponding to the port identification "HTTP" to be "8080" (step S255).

On the other hand, the NCS 5f instructs the HTTP daemon 51 to end the operation of the daemon 51 (step S256) When the HTTP daemon 51 receives the end instruction in step S256, the HTTP daemon 51 closes all ports previously opened by the HTTP daemon 51 (step S257). Subsequently, the HTTP daemon 51 requests the network service library 24 to update the port state (step S258). The network service library 24 writes the port state. That is, the network service library 24 refers to the port information management file F1, changes the port state showing "ACTIVE" to be "INACTIVE", and ends the operation of the daemon 51 (step S259).

After the HTTP daemon 51 ends the operation, the NCS 5f activates the HTTP daemon 51 again (step S261). Next, the NCS 5f requests the e-mail notification application 200b to inform the change of the port number for the HTTP by e-mail (step S262).

The e-mail notification application 200b obtains a plurality of e-mail addresses of users, who are registered to the image forming apparatus 1, from the UCS 5g, sets the plurality of e-mail addresses as destinations, sends e-mails informing the change of the port number from a port that is temporarily opened for an e-mail transmission, and ends the operation (step S263).

As described above, it is possible for the user to set the port number for the HTTP from the operation panel 113 or the HTTP client 9. In this case, the port number corresponding to the port identification "HTTP" is set. Therefore, the user, the OCS 5e, and the Websys 20a are not required to concern a correspondence between a network protocol and the port number, and can simply indicate the port number corresponding to the port identification "HTTP".

An operation in a case of using the changed port number will be described with reference to FIG. 24 through FIG. 27.

Figure 24:
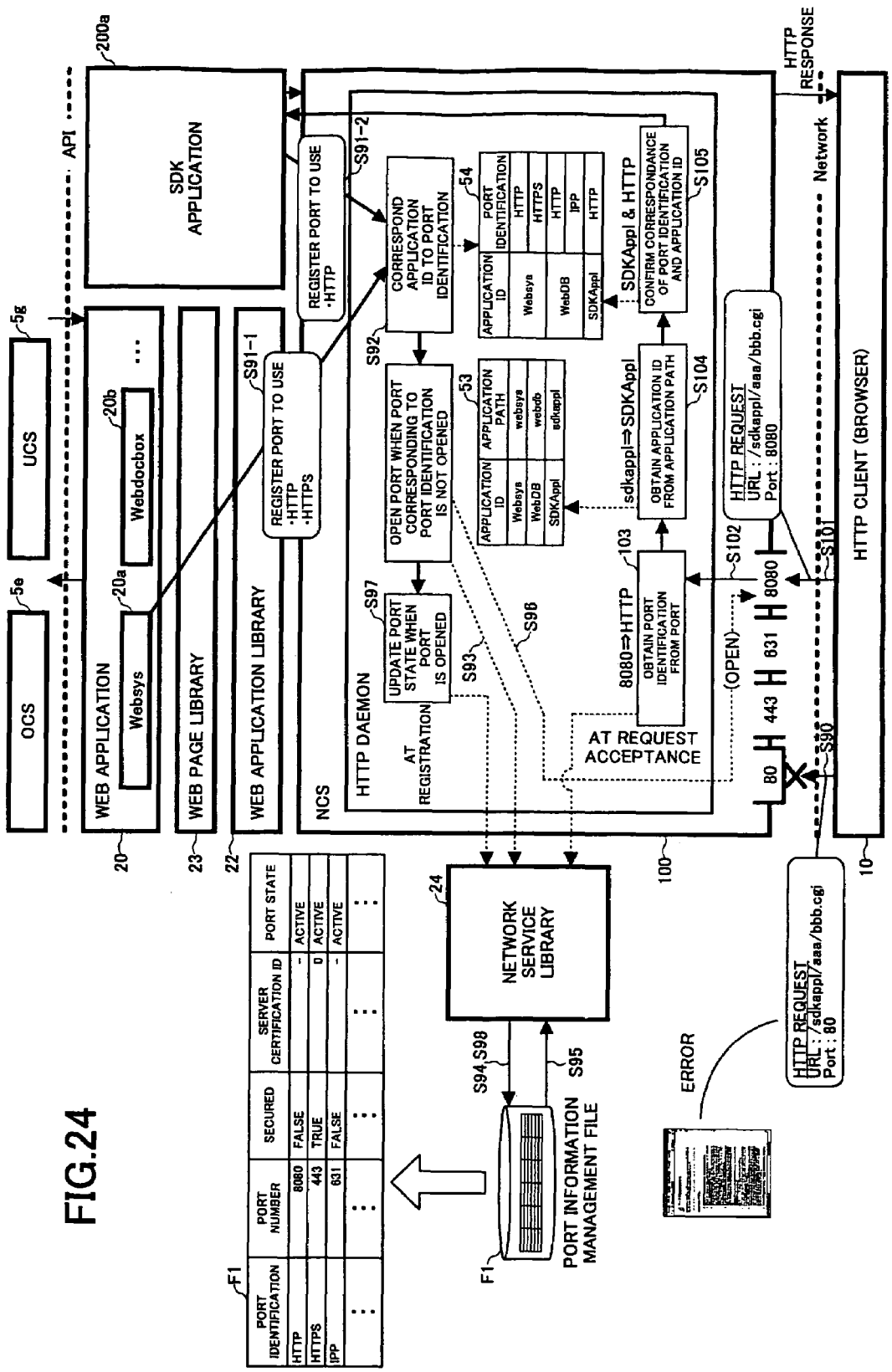
FIG. 24 is a diagram showing the operation in the case of using the changed port number for the HTTP, according to the embodiment of the present invention.

FIG. 24 is a diagram showing the operation in the case of using the changed port number for the HTTP, according to the embodiment of the present invention. In FIG. 24, the Websys 20a of the Web application 20 requests the HTTP daemon 51 of the NCS 5f to register the port identification (for example, HTTP and/or HTTPS) to use (step S91-1). Similarly, the SDK application 200a requests the HTTP daemon 51 of the NCS 5f to register the port identification (for example, HTTP) to use (step S91-2). It should be noted that an order of registrations is not defined by the step S91-1 and the step S91-2.

The HTTP daemon 51 corresponds the application ID identifying a request originator to the port identification being request to register (step S92). The HTTP daemon 51 obtains the port number based on the port identification from the network service library 24 (step S93) When the network service library 24 receives a port number obtain request from the HTTP daemon 51, the network service library 24 searches for the port information management file F1 based on the port identification (step S94), obtains the port number from the port information management file F1 (step S95), and then informs the port number to the HTTP daemon 51.

Next, the HTTP daemon 51 opens a port specified by the port number obtained from the port information management file F1 when the port is not opened (step S96) In this case, each of the port "8080" for the HTTP and the port "443" for the HTTPS is opened.

The HTTP daemon 51 updates the port state in a case in that the port is opened in step S96 (step S97). When the network service library 24 receives a port state update request from the HTTP daemon 51, the network service library 24 changes the port state of the port number indicated by the port state update request in the port information management file F1 to be "ACTIVE". In this case, the port "8080" for the HTTP and the port "443" for the HTTP are changed to "ACTIVE".

When the HTTP client 9 sends the HTTP request to the port "80" being closed (step S100), since the port "80" is closed, the HTTP client 9 cannot access to the image forming apparatus 1 and then an error notification is displayed at the HTTP client 9. Therefore, it is possible to prevent an illegal access to the port "80".

The HTTP client 9 requests the Web page to the image forming apparatus 1 by using the port number "8080". That is, when the HTTP request is sent to the image forming apparatus 1 through the port number "8080" (step S101), the image forming apparatus 1 receives the HTTP request by the port number "8080" (step S102). Therefore, it is possible for the image forming apparatus 1 to receive the HTTP request only from the user who knows the change of the port number.

The HTTP daemon 51 obtains the port identification from the port number through the network service library 24 (step S103). In this case, the port identification "HTTP" is obtained from the port number "8080".

Also, the HTTP daemon 51 refers to the application ID-application path correspondence table 53, and obtains the application ID from the application path of the HTTP request (step S104). In this case, the application ID "SDKAppl" is obtained from the application path "sdkappl".

Moreover, the HTTP daemon 51 confirms a correspondence between the port identification and the application ID by referring to the application ID-port identification correspondence table 54, and executes an application corresponding to application ID (step S105). In this case, the HTTP daemon 51 confirms by referring to the application ID-port identification correspondence table 54 that the application ID "SDKAppl" corresponds to the port identification "HTTP", and executes the SDK application 200a by using the application ID "SDKAppl" since the HTTP request is received at the port specified by the port identification "HTTP".

FIG. 25 is a diagram showing a detailed sequence for explaining the operation in the case of using the changed port number for the HTTP, according to the embodiment of the present invention. In FIG. 25, when the Web application 20 or the SDK application 200a requests the HTTP daemon 51 to register a port to use (step S191), the HTTP daemon 51 corresponds the application ID to the port identification to use by using the application ID-port identification correspondence table 54 (step S192).

Furthermore, the HTTP daemon 51 obtains the port identification from the network service library 24 based on the port number (step S193). When the network service library 24 receives a port number obtain request from the HTTP daemon 51, the network service library 24 reads the port number from the port information management file F1 based on the port identification. That is, the network service library 24 searches for the port information management file F1 based on the port identification (step S194), obtains the port number from the port information management file F1 (step S195), and then informs the port number to the HTTP daemon 51.

Next, the HTTP daemon 51 opens the port specified by the port number obtained from the network service library 24 (step S196). In this case, each of the port "8080" for the HTTP and the port "443" for the HTTPS is opened.

When the HTTP daemon 51 opens the port in step S196, the HTTP daemon 51 updates the port state (step S197) When the network service library 24 receives a port state update request from the HTTP daemon 51, the network service library 24 changes the port state of the port number indicated by the port state update request to be "ACTIVE" in the port information management file F1 (step S198). In this case, each of the port "80" for the HTTP and the port "443" for the HTTPS is changed to "ACTIVE".

The state transition of the port information management file by the operation in the case of using the changed port number for the HTTP will be described with reference to FIG. 26A and FIG. 26B. FIG. 26A is a diagram showing a state of the port information management file when the port number is read by the network service library in step S194 in FIG. 25, according to the embodiment of the present invention. In FIG. 26A, for example, in the port information management file F1, for the port identification "HTTP", the port number field shows "8080", the secured field shows "FALSE", the server certification ID field shows "-" (not set), and the port state field shows "INACTIVE". Moreover, for the port identification "HTTPS", the port number field shows "443", the secured field shows "TRUE", the server certification ID field shows "0", and the port state field shows "INACTIVE".

FIG. 26B is a diagram showing the state of the port information management file when the port number is written by the network service library 24, according to the embodiment of the present invention. In FIG. 26B, it can be seen that the port state of the port identification "HTTP" is changed from the "INACTIVE" to "ACTIVE", and similarly, the port state of the port identification "HTTPS" is changed from "INACTIVE" to "ACTIVE".

Figure 27:
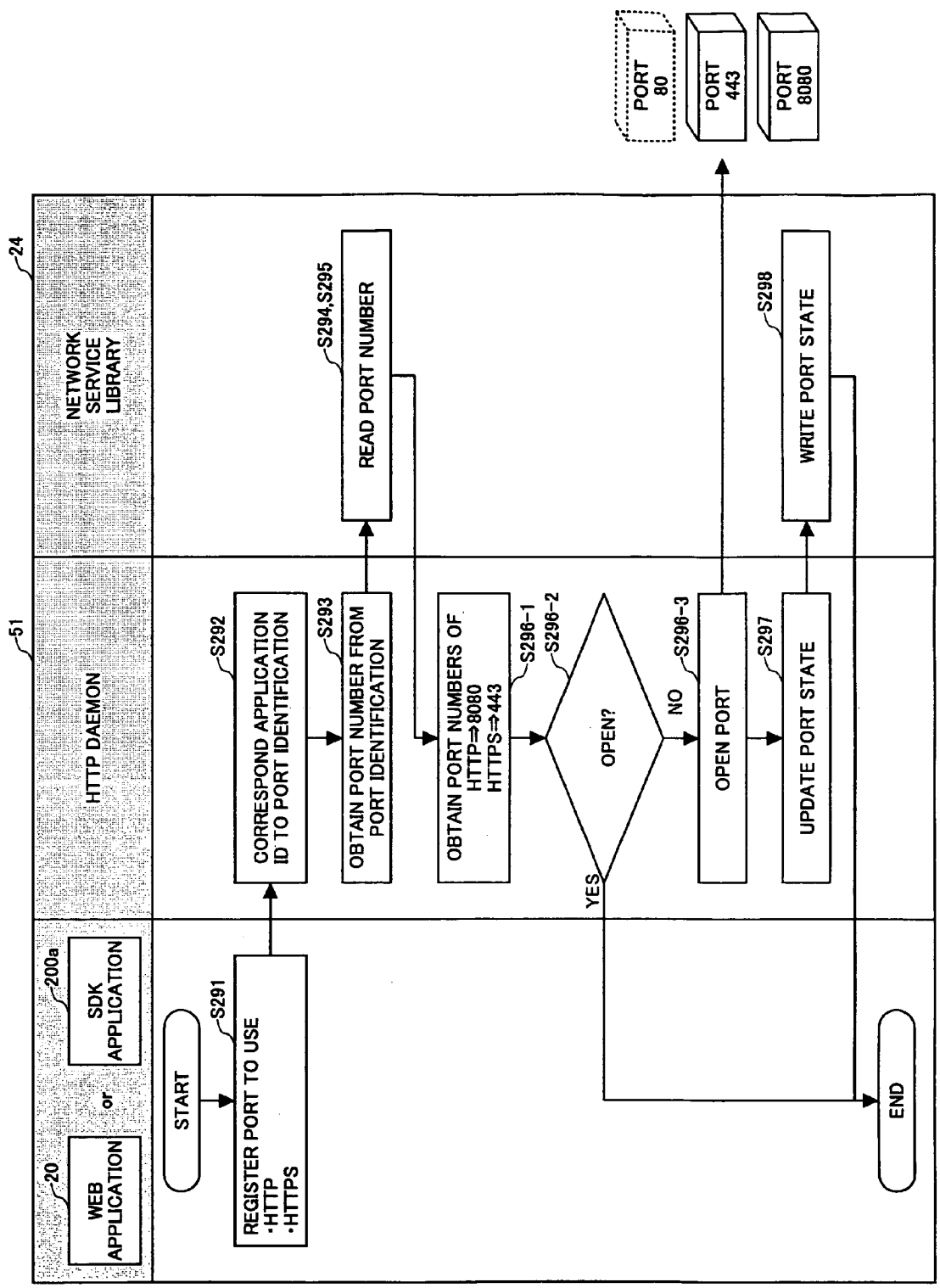
FIG. 27 is a flowchart for explaining the operation in the case of using the changed port number for the HTTP, according to the embodiment of the present invention.

FIG. 27 is a flowchart for explaining the operation in the case of using the changed port number for the HTTP, according to the embodiment of the present invention. In FIG. 27, the Web application 20 or the SDK application 200a requests the HTTP daemon 51 to register the port to use (step S291), and the HTTP daemon 51 corresponds the application ID to the port identification to use by using the application ID-port identification correspondence table 54 (step S292).

Moreover, the HTTP daemon 51 obtains the port number from the network service library 24 based on the port identification (step S293). When the network service library 24 receives a port number obtain request from the HTTP daemon 51, the network service library 24 reads the port number form the port information management file F1 based on the port identification. That is, the network service library 24 searches for the port identification management file F1 based on the port identification (step S294), obtains the port number from the port information management file F1 (step S295), and then informs the port number to the HTTP daemon.

The HTTP daemon 51 receives the port number "80" corresponding to the port identification "HTTP", and obtains the port number "443" corresponding to the port identification "HTTPS" (step S296-1). The HTTP daemon 51 determines whether or not each of the port "8080" and the port "443" is opened (step S296-2). When both ports have been already opened, the operation is terminated.

On the other hand, when each of port "8080" and the port "443" is not opened, the HTTP daemon 51 opens each of port "8080" and the port "443" (step S296-3). In this case, the port "80" is not opened. Next, the HTTP daemon 51 requests the network service library 24 to update each port state of the port "8080" and "443" (step S297).

The network service library 24 writes the port states corresponding to the port number "8080" and the port number "443" (step S298). That is, the port states corresponding to the port number "8080" and the port number "443" are change to be "ACTIVE".

According to the embodiment, the change of the address (URL for the changed port number) is informed to the plurality of users by the Web page (such as the screen 42 as shown in FIG. 16), and e-mails using the document distribution function (Scan to Mail). Alternatively, the change of the address (URL for the changed port number) can be informed by using fax numbers of the plurality of users managed by the UCS 5g and conducting the fax application 2b.

Moreover, as the communication protocol for the network, HTTP is used as an example but it is not limited to HTTP. Protocols such as FTP (File Transfer Protocol), IPP (Internet Printing Protocol), SNMP (Simple Network Management Protocol), and a like can be applied to the embodiment.

According to the present invention, by defining the port identification uniquely identifying the port corresponding to the network protocol and using the port identification to register the port to use in a Web server, it is possible to change the port number while the Web application being implemented in the image forming apparatus 1 and the SDK Web application do not concern the port number.

Moreover, an URL address to access the image forming apparatus 1 (business apparatus) including a new port number is informed to the plurality of users who are valid to use the image forming apparatus 1 when the port number is changed or newly set. Therefore, it is possible to easily inform the plurality of users that the port number is changed.

The present invention is not limited to the specifically disclosed embodiments, and variations and modifications may be made without departing from the scope of the present invention.

The present application is based on the Japanese Priority Application No. 2004-003119 filed on Jan. 8, 2004, the entire contents of which are hereby incorporated by reference.

What is claimed is:

1. An embedded business apparatus including a Web server function, in which the Web server function receives a network protocol request including an IP address by a network protocol daemon and a port number, processes the network protocol request, and responds to the network protocol request by sending a network protocol response, the apparatus comprising:

a network controller configured to control receiving the network protocol request and sending the network protocol response;

a plurality of Web applications each configured to register a port to use by using a port identification to the network controller; and a program stored in a memory and configured for the network controller to manage each state of ports corresponding to the port identification and a port number, wherein when the network protocol request includes an acquisition request of port information including a port number specifying the port, the network controller makes a predetermined Web application in the plurality of the Web applications to generate Web information displaying the port information, and allowing a user to input a change instruction for changing the port number by processing the acquisition request, and sends the network protocol response including the Web information, and the network controller accesses the program and changes the port number in response to the change instruction of the user, wherein when the Web server function receives the network protocol request including a set request conducted for the change instruction of the port information, which is set by using the network protocol response, the Web server function sets the port information in accordance with the set request.

2. The embedded business apparatus as claimed in claim 1, wherein the Web server function informs that the port information is set.

3. The embedded business apparatus as claimed in claim 2, further comprising a document distribution function for distributing document data through a network, wherein the Web server function informs by electronic mail that the port information is set, by using the document distribution function.

4. The embedded business apparatus as claimed in claim 3, wherein a link including port information being set is provided in the electronic mail.

5. The embedded business apparatus as claimed in claim 3, wherein the Web server function informs to destinations being registered in the document distribution function or a facsimile function by using the document distribution function or the facsimile function.

6. The embedded business apparatus as claimed in claim 1, wherein the port information includes port identification uniquely identifying a port corresponding to the network protocol, and the Web sewer function sets the port information based on the port identification and obtains the port information.

7. The embedded business apparatus as claimed in claim 1, further comprising at least one application for processing the network protocol request, wherein the port information, which the application itself processes, is registered to the network protocol daemon.

8. The embedded business apparatus as claimed in claim 1, wherein the port information registered by the application is the port identification.

9. A method for receiving a network protocol request and sending a network protocol response, in which a web server function receives the network protocol request including an IP address by a network protocol daemon and a port number, the network protocol request is processed, and the network protocol response is sent as a response for the network protocol request, the method comprising:

controlling, by a network controller, receiving the network protocol request and sending the network protocol response;

a plurality of Web applications each registering a port to use by using a port identification to the network controller; and the network controller managing each state of ports corresponding to the port identification and a port number, wherein when the network protocol request includes an acquisition request for obtaining port information including a port number specifying the port the network controller makes a predetermined Web application in the plurality of the Web applications to generate Web information displaying the port information, and allowing a user to input a change instruction for changing the port number by processing the acquisition request, and sends the network protocol response including the Web information, and the network controller changing the port number in response to the change instruction of the user, wherein when the Web server function receives the network protocol request including a set request conducted for the change instruction of the port information, which is set by using the network protocol response, the Web server function sets the port information in accordance with the set request.

10. A computer-readable recording medium recorded with a program to be executed by computer for causing the computer functioning as a Web server to receive a network protocol request and send a network protocol response, in which the Web server function receives a network protocol request including an IP address by a network protocol daemon and a port number, processes the network protocol request, and responds to the network protocol request by sending a network protocol response, the program controlling the computer to perform operations comprising:

controlling, by a network controller, receiving the network protocol request and sending the network protocol response;

a plurality of Web applications each registering a port to use by using a port identification to the network controller; and the network controller managing each state of ports corresponding to the port identification and a port number, wherein when the network protocol request includes an acquisition request of port information including a port number specifying the port, the network controller makes a predetermined Web application in the plurality of the Web applications to generate Web information displaying the port information, and allowing a user to input a change instruction for changing the port number by processing the acquisition request, and sends the network protocol response including the Web information, and the network controller accessing the program and changing the port number in response to the change instruction of the user, wherein when the Web server function receives the network protocol request including a set request conducted for the change instruction of the port information, which is set by using the network protocol response, the Web server function sets the port information in accordance with the set request.

* * * * *